United States Patent [19]

Anderson et al.

[11] 4,406,626

[45] Sep. 27, 1983

[54] ELECTRONIC TEACHING AID

[76] Inventors: Weston A. Anderson, 763 La Para Ave., Palo Alto, Calif. 94306; Gerald M. Fisher, 1491 Greenwood Ave., Palo Alto, Calif. 94301

[21] Appl. No.: 362,666

[22] Filed: Mar. 29, 1982

Related U.S. Application Data

[63] Continuation of Ser. No. 62,286, Jul. 31, 1979, abandoned.

[51] Int. Cl.³ .......................... G09B 5/06; G06K 9/00
[52] U.S. Cl. ................................ 434/169; 179/1 SA; 364/419; 434/307; 434/308; 434/157
[58] Field of Search ............... 434/156, 157, 169, 307, 434/308, 314; 312; 179/1 SA, 1 SM, 1 SP; 364/419

[56] References Cited

U.S. PATENT DOCUMENTS

| 2,548,011 | 4/1951 | Frost | 434/313 |
| 3,648,387 | 3/1972 | Lahr | 434/312 |
| 3,836,717 | 9/1974 | Gagnon | 179/1 SA X |
| 3,909,533 | 9/1975 | Willimann | 179/1 SA |
| 3,932,859 | 1/1976 | Kyriakides et al. | 434/156 |

FOREIGN PATENT DOCUMENTS 692949  8/1965  Italy ..................................... 434/157

Primary Examiner—William H. Grieb
Attorney, Agent, or Firm—Gerald M. Fisher

[57] ABSTRACT

An electronic teaching aid which enables a student viewing a visual display containing text material being read or studied to designate any words or portion of said text for immediate audible vocalization or alternatively to designate any word of said test for immediate visual display of the definition of said designated word.

20 Claims, 26 Drawing Figures

FIG.6A — WORD 1 TEXT / WORD 1 SPEECH / WORD 1 DICTIONARY

| DC4 | PAGE | PAGE | CR | SP | SP | C | I | T | Y | DC1 | S | I | T | E | E | DC2 | B | I | G | SP | T | O | W | N | DC3 |
|---|---|---|---|---|---|---|---|---|---|---|---|---|---|---|---|---|---|---|---|---|---|---|---|---|---|
| | | | 1 | 2 | 3 | 4 | 5 | 6 | 7 | 8 | 1 | 2 | 3 | 4 | 5 | 6 | 1 | 2 | 3 | 4 | 5 | 6 | 7 | 8 | 9 |

FIG.6B — WORD 2 TEXT / WORD 2 SPEECH / WORD 2 DICTIONARY / WORD 3 TEXT / WORD 3 SPEECH

| P | E | O | P | L | E | DC1 | P | E | E | P | A | L | DC2 | H | U | M | A | N | S | DC3 | A | R | E | DC1 | A | A | R | DC2 | VS | DC |
|---|---|---|---|---|---|---|---|---|---|---|---|---|---|---|---|---|---|---|---|---|---|---|---|---|---|---|---|---|---|---|
| 9 | 10 | 11 | 12 | 13 | 14 | 15 | | | | | | | | | | | | | | | 16 | 17 | 18 | 19 | | | | | | |

FIG.6C — WORD 4 TEXT / WORD 4 SPEECH / WORD 4 DICTIONARY

| DC3 | C | O | M | P | L | E | X | , | SP | SP | SP | SP | DC1 | | | | | | | | | CR |
|---|---|---|---|---|---|---|---|---|---|---|---|---|---|---|---|---|---|---|---|---|---|---|
| | 20 | 21 | 22 | 23 | 24 | 25 | 26 | 27 | 28 | 29 | 30 | 31 | 32 | 33 | | | | | | | | |

FIG.6D — TEXT / SPEECH / DICTIONARY

| CR | DC1 | DC2 | DC4 | PAGE | PAGE | CR |

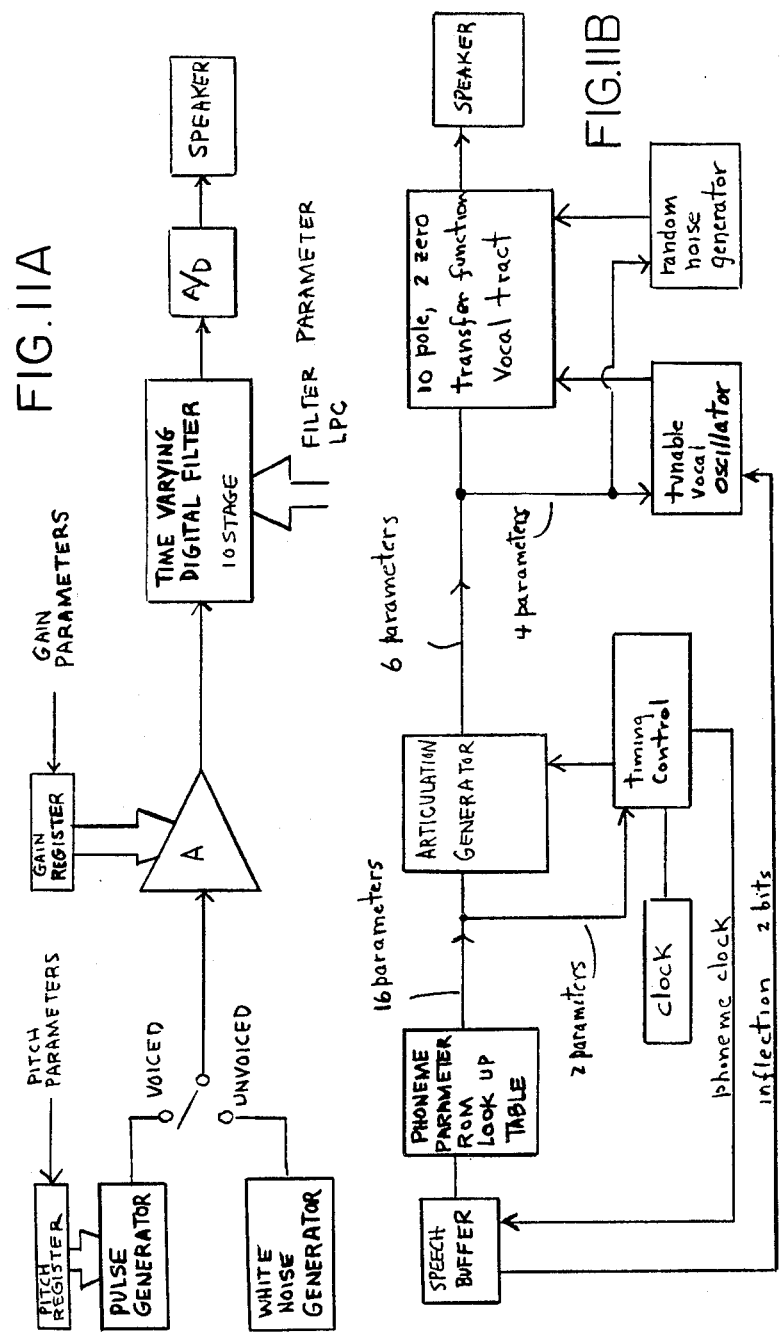

FIG.12
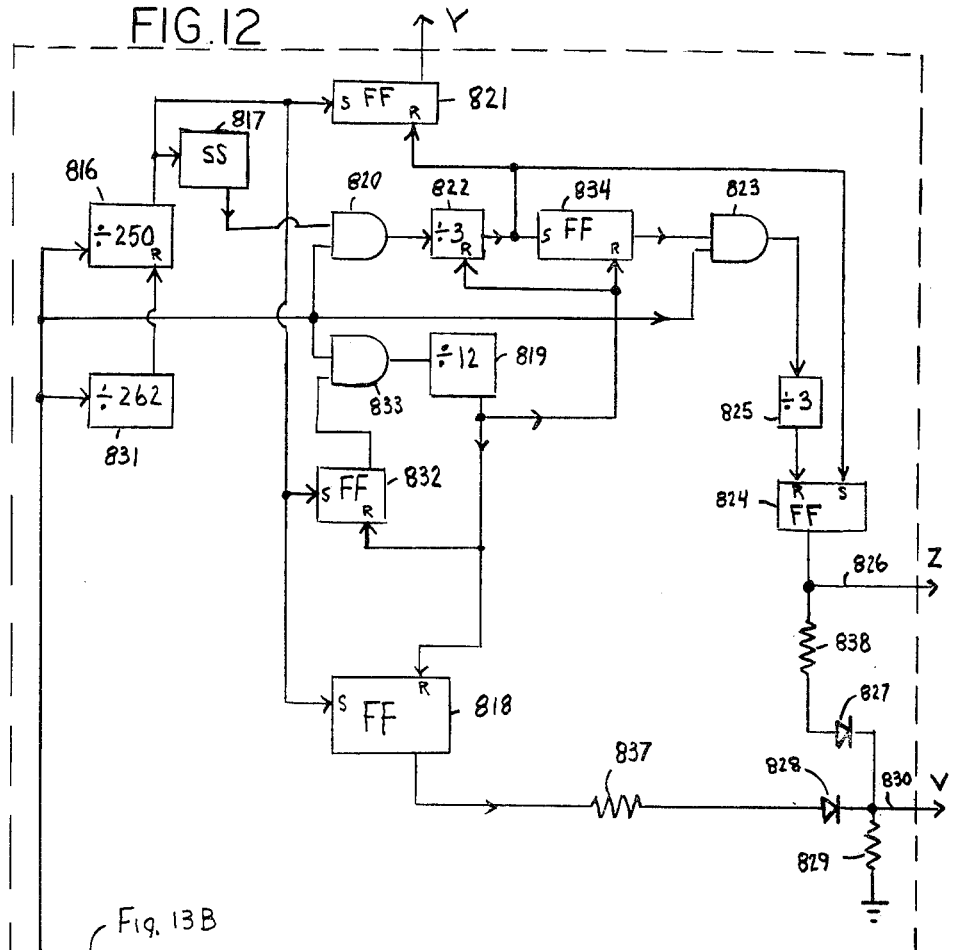
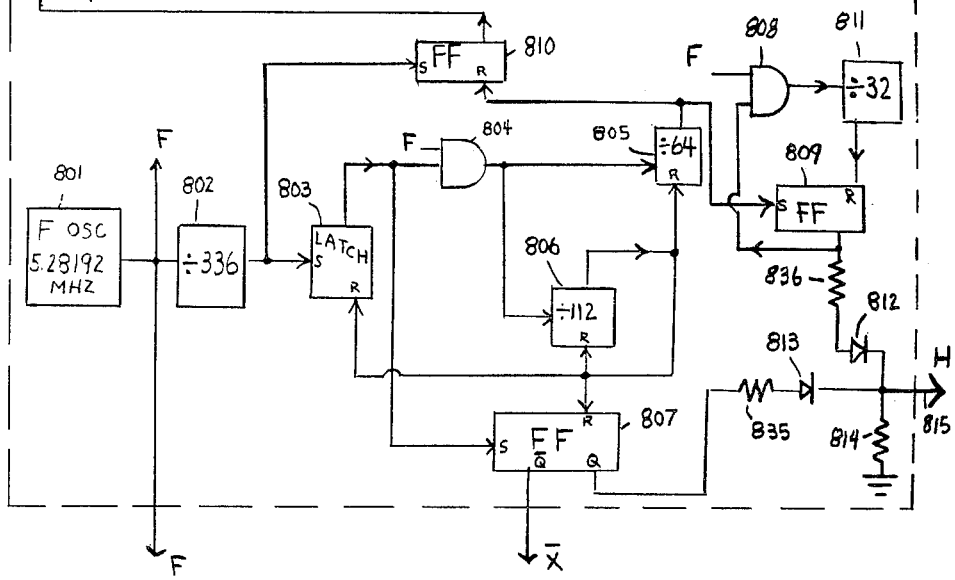

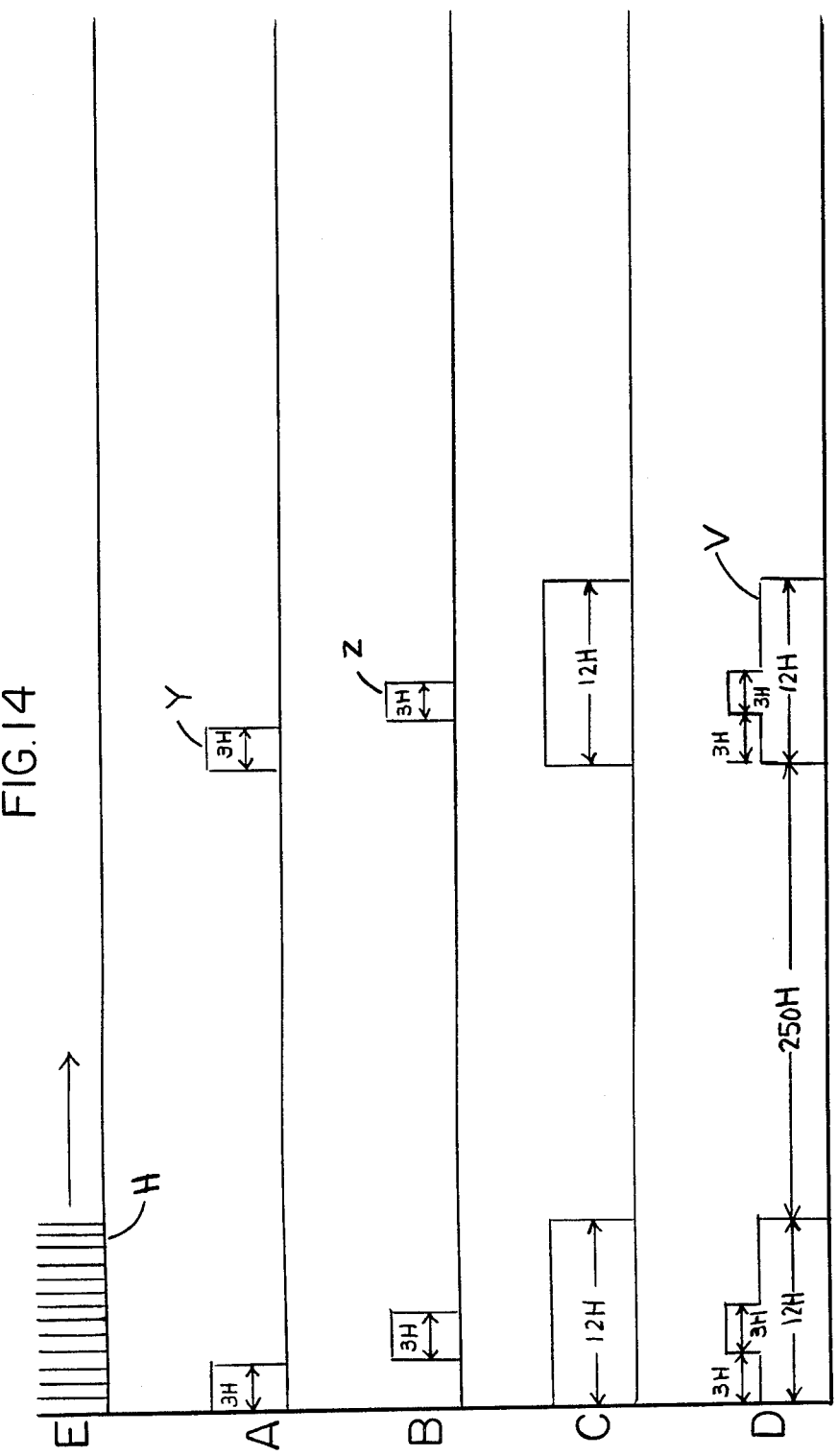

ELECTRONIC TEACHING AID

This application is a continuation, of application Ser. No. 62286, filed July 31, 1979 now abandoned.

TECHNICAL FIELD

This invention relates to electronic teaching aids and more particularly to electronic devices providing interaction with a student that closely simulates the one to one student/teacher situation.

BACKGROUND OF THE INVENTION

Reading proficiency of youthful students, in modern schools, has been decreasing alarmingly in the past twenty years. Studies have attributed this problem to numerous social influences. Most prominantly blamed factors are more permissive theories of education and the domination of leisure hours by television. Various educational handicaps such as dyslexia and economic/social background have been identified as stubborn problems which resist even the very expensive and intense experimental programs which have been mounted to counteract these effects. Computer aided systems are in place in some school systems for teaching objective subjects but the benefits available with such systems are limited to those students capable of reading at the required level. Due to the fact that mastery of reading is a tedious and difficult task for many children, the only technique which is generally successful for most students with reading difficulty is a one-to-one student/teacher relationship. The one-to-one relationship provides speed and flexibility which enables the student to read quickly enough through the reading material so as to gain the satisfaction and reward from perceiving the meaning of the material before frustration and defeatism bring work to a halt. However, this one-to-one teacher/student ratio is too expensive to be practical in most schools. Additionally, the one-to-one technique is not generally successful for the teaching of older students because of the embarrassment and negative self-appraisal arising from repetitive correction, frustration and student/teacher fatigue.

The prior art audio techniques employ devices for teaching pronounciation of words in a foreign language. These devices permit a student to practice his/her pronounciation of words and then to listen to his/her pronounciation immediately before or after the pronounciation by an expert. However, such techniques do not permit selective interaction with the student to support practice in visually decoding (reading) and understanding the written form of a language.

Speaking machines have also been used in conjunction with devices which pronounce words to test a students ability to spell the pronounced words. While such a device is indirectly useful in teaching a reading skill, it is not capable of interacting directly and flexibly in the teaching of the reading of a language.

One of the difficult problems in the first few years in the teaching of reading to children is the inability to provide text material having sufficient interest to hold the reader's attention while, at the same time, not exceeding the child's reading vocabulary. If this problem had been solved, it would be expected that much more rapid reading progress would be achievable because the child would be internally motivated resulting in more efficient reading time. This is true at least through the eighth year in most schools since a child's reading vocabulary remains less than his speaking vocabulary through those years.

SUMMARY OF THE INVENTION

The system of this invention largely overcomes earlier teaching problems by enabling a child to read through the text quickly enough to perceive meanings thereby taking advantage of personal motivation. These two factors—personal motivation and continued reading—are the keys to rapid progress in development of reading skills. This invention provides a visual display containing the text material to be read. The student can quickly, at his option, obtain an audible sounding of any word providing him reading difficulty, or alternatively, a visual display of the definition of any word and, hence, the student is able to read rapidly through any text material Accordingly, text materials may be selected by the student or teacher based on personal interest almost without regard to the grade level of the material. Additionally embarrassment and frustration arising from need to obtain repeated assistance on simple words, is greatly diminished since the inventive machine is entirely impersonal.

The object of this invention is to simulate the supportive aspects of a one-to-one student/teacher interaction and to eliminate the negative non-supportive aspects of the one-to-one human relationship. A feature of this inventive device is that it permits interaction with the reading student with infinitely variable text material, providing immediate audio soundings of only selected words designated by the student to be voiced.

A further feature of the invention is that it further provides a definition mode which enables the student to also obtain a visual display of the definition of words of text being displayed.

A still further feature includes providing a special signal tone to indicate that a word designated for speech or definition is not coded in the input data for the audible or definition function.

BRIEF DESCRIPTION OF THE DRAWINGS

FIG. 6 is illustrative of input signal format in one embodiment of the invention illustrating the format of the data stored on the long term bulk storage.

FIG. 11 is a block diagram of two different types of speech synthesizers.

FIG. 12 is a schematic of raster and blanking control circuits.

FIG. 14 is an illustration of other signal waveforms used in the system.

DETAILED DESCRIPTION OF THE INVENTION

Figure 1:
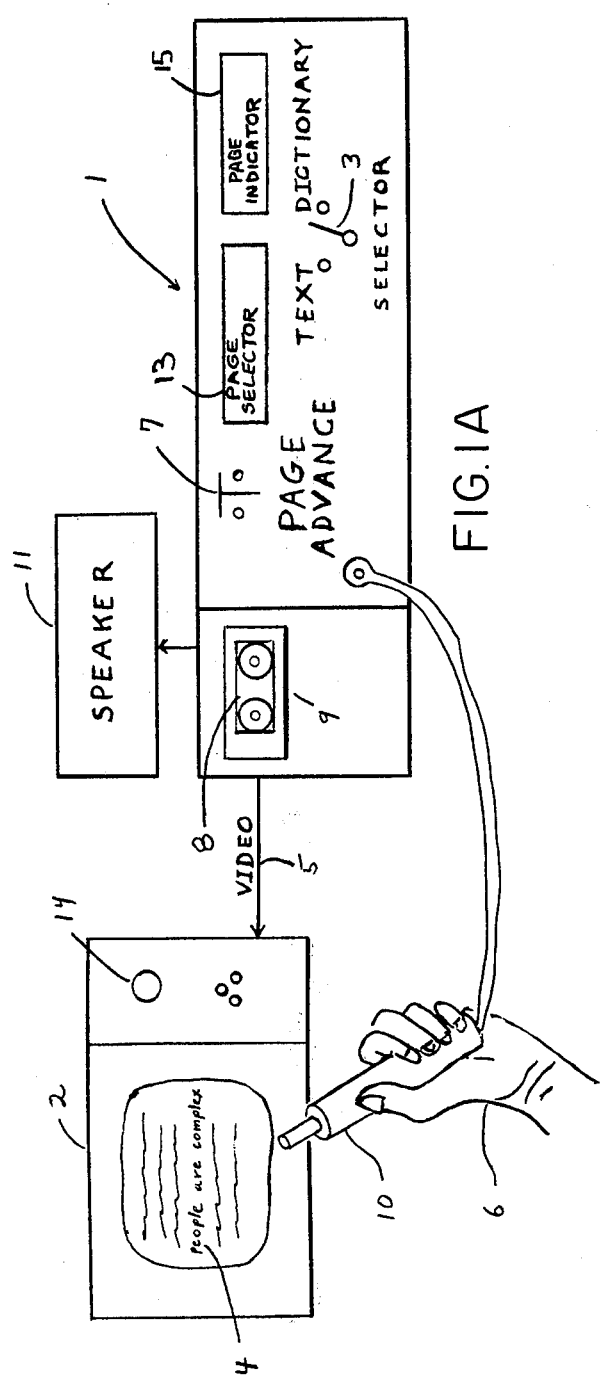
FIG. 1A is a block diagram showing the interconnection of the major elements of the system.
FIG. 1B is an alternate word designator.

The major elements of the preferred embodiment of the system with which the operator interacts are illustrated pictorially in FIG. 1A. The system 1 is shown connected to a television receiver 2. In operation, when text/dictionary selector switch 3 is placed in text position, data is sent to the TV set 2 on output line 5 and is displayed on the TV screen 4 in legible form. If the operator 6 has finished reading the page on the TV screen, or wishes to advance to the next page, the page advance button 7 is depressed and next page of text will be displayed on the TV screen. The system 1, in response to the actuation of the page advance switch, 7, causes the text data which had originated in a bulk memory such as cassette tape 8 to be made available after conversion to appropriate control signals, all of which will be explained subsequently, for control of the TV set. The channel selector 14 of the TV receiver will be set on a channel frequency which is not used for standard broadcast TV in the vicinity. In the United States this is channel 3 or 4. The video output 5 may be connected directly to the external antenna input terminals (not shown) of a standard TV or it may be directly provided to the internal video or CRT control circuits of a customized video display. Alternatively, the operator can display any page of the text by setting on page selector 13, the desired page of text to be displayed, and then depressing the page advance button 7. After a short period, the selected page will appear on the TV screen.

If the operator 6 comes upon a word on the TV display which he does not know how to read or how to pronounce, or for any reason wishes to hear the correct pronunciation, by placing the input of the word designator light pen 10 near or touching the face plate of the TV screen, overlaying or in close proximity to the word to be spoken, the operator will almost immediately hear, from speaker 11 the spoken form of the designated word. The system 1, in response to a pulse from the word designator 10, retrieves the operator designated word in a coded form from a memory and provides appropriate commands to a speech synthesizer which then provides an output to speaker 11. Each of the words of the text can be appropriately coded for speech. Both the text for the TV display and the speech function originate in code initially stored on cassette tape 8. In the preferred embodiment, two pages of text and speech codes are taken from cassette and are stored in dynamic memory so that no delay is noticed by the operator in perceiving the new display after actuating the page advance 7.

A further mode of operation of the inventive system is available to an operator who desires a definition of a word on the TV screen. By selecting the text word with the word designator light pen 10 as described above and then placing selector switch 3 in dictionary position, the system control unit will cause the TV screen to display the definition of the designated word. It is understood that the definition need not be provided in the same language as the text. This enables the system to be used in learning foreign languages as well as in learning to read the written form of one's native language. The definitions for the words of text also originate in code in the cassette tape 8 and are stored in dynamic memory in system 1, to be available in conjunction with the page of text being displayed by the operator.

TAPE DATA FORMAT

Figure 7:
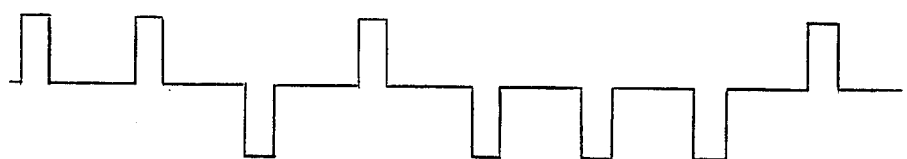
FIG. 7 is illustrative of some of the recording waveforms used in the system.

It is a requirement that the cassette 8 data, i.e., books or text material, which is to be displayed on the TV is appropriately formated for use with the system. Although various memory devices could be employed to store the basic text, the most convenient and cheapest form of memory is magnetic tape. Accordingly, in the preferred embodiment, the text material supplied for use with this invention is stored in cassette 8. FIG. 7 depicts the manner of recording data on the bulk memory. To permit asynchronous operation of the tape, data is recorded in bipolar format.

Figure 2:
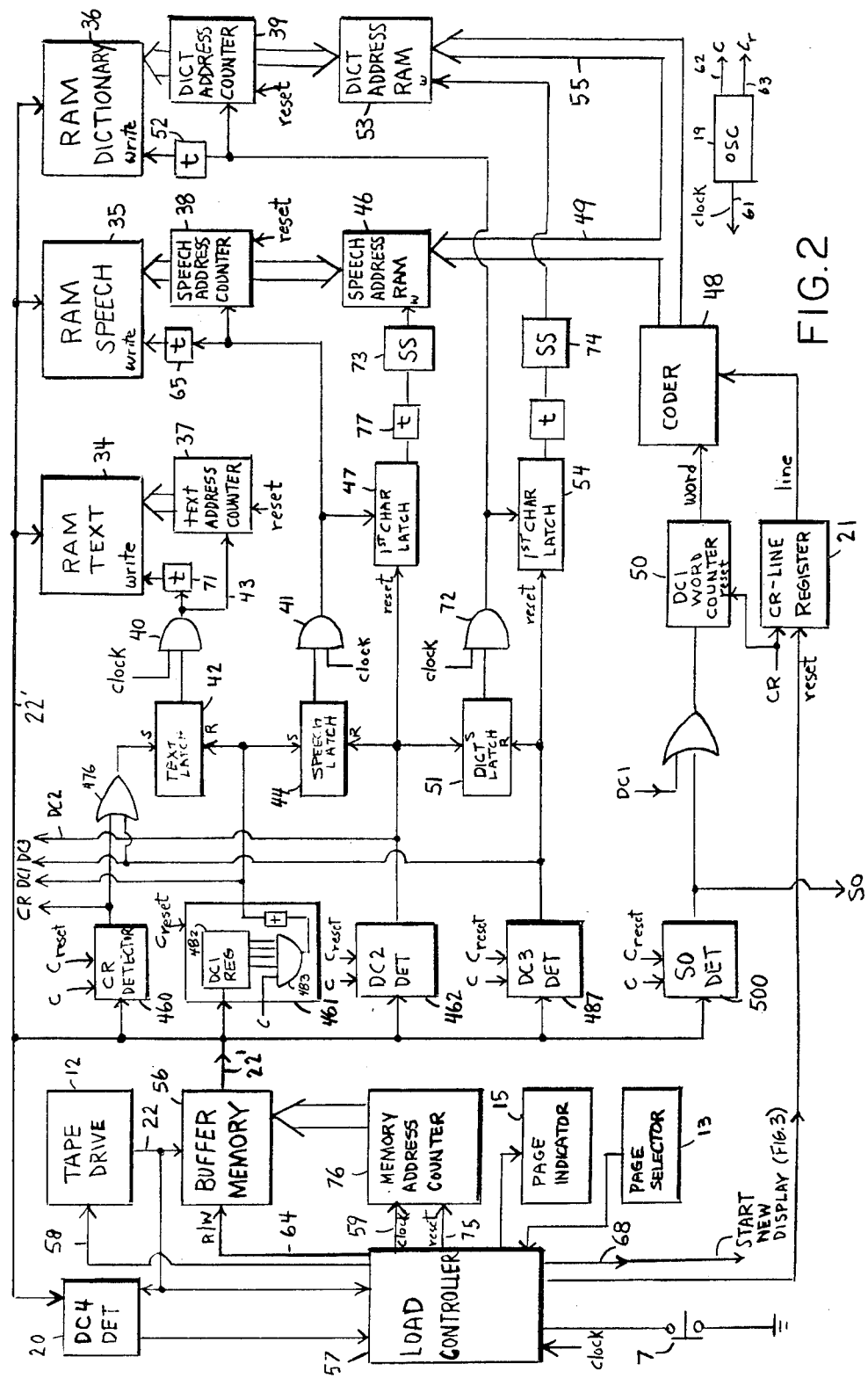
FIG. 2 is a block diagram of the portion of the system showing the interconnections of the elements used for temporary storage of the data to be displayed and vocalized.

FIG. 6 illustrates the data format used with the embodiment of the invention illustrated in FIG. 2. The USASC II code standard is employed, better known as ASC II. ASC II 8 bit code is employed for alphanumeric data stored in the cassette tapes. With reference to FIG. 6a, the first byte of 8 bits, 349, is designed DC4 in the standard ASC II code, and is used to represent the page marker. Following the page marker 349, is three ASCII 8 bit binary coded words with the page number of the page of text to follow. Next is the 8 bits of data shown in FIG. 6a, 350, which is designated CR and is used to represent the line marker. When page advance button 7, FIG. 1, is depressed, the tape player 9 initiates the loading of the data for the next page from cassette tape 8 into the memory of the system 1.

With reference to FIG. 2, when the tape drive 12 is operating, data is provided on the signal line 22. Upon the arrival and decoding of the DC4 code word, in DC4 detector 20, FIG. 2, a page advance command is sent to control 57 which immediately results in the generation of a reset to the CR line register 21 and advances page indicator 15.

Figure 3:
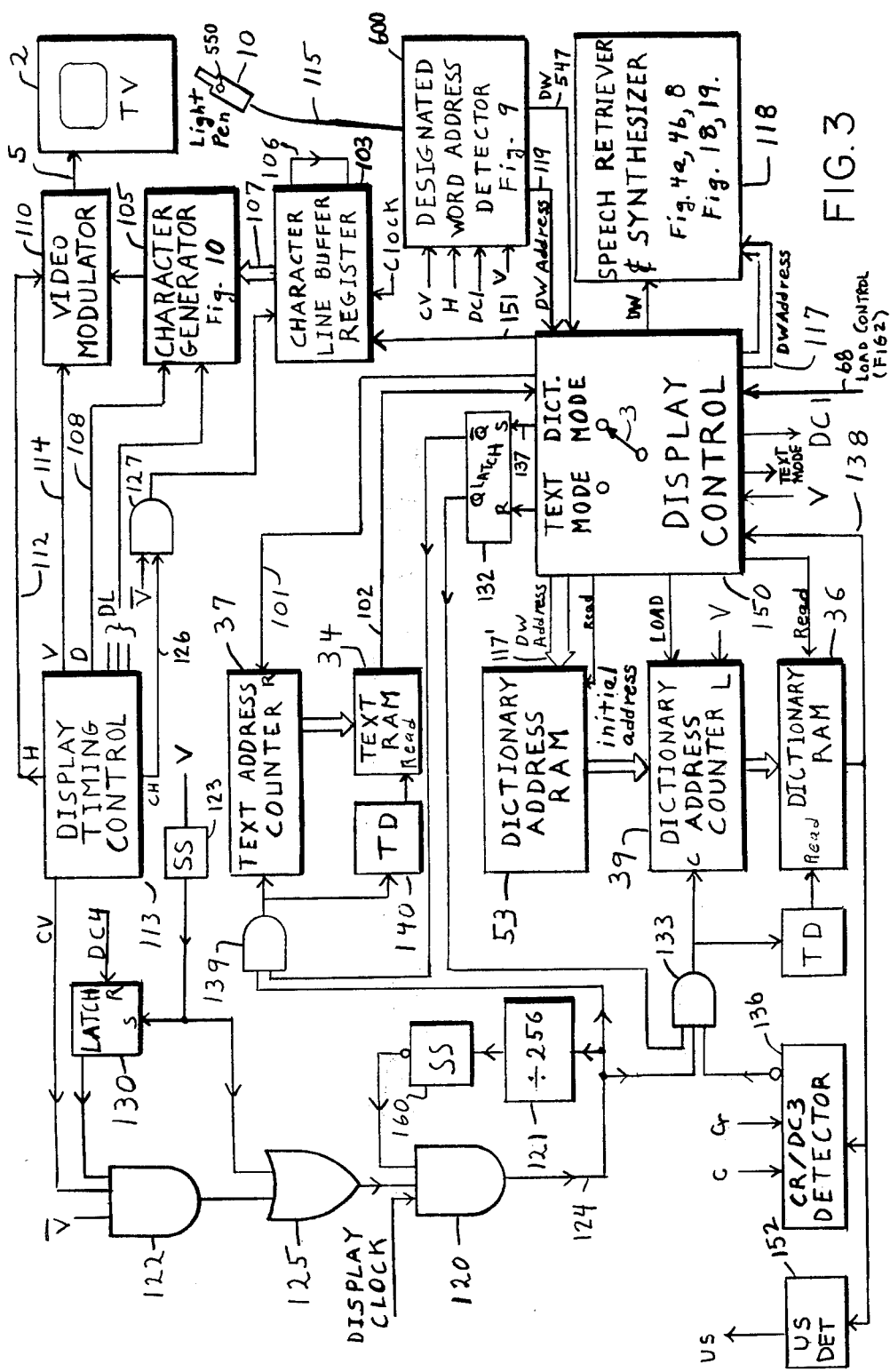
FIG. 3 is a block diagram of the portion of one embodiment of the system for controlling text display and retrieval of designated words.

The first word of text recorded on the cassette tape 8 follows the CR code word. Assuming the first line of text commences a new paragraph, the ASC II 8 bit code for spaces are provided. In FIG. 6a, 3 spaces, 353–355, are illustrated to provide the paragraph indentation before the first English character 356 of the text message is provided. The first letter in the text is illustrated at 356 as a "C" which is represented by the ASC II 8 bit code for the letter "C". Assuming the first text word is the English word "City", the ASC II codes for the letters "c", "i", "t" and "y" are each sequentially recorded in sequential 8 bit slots on the tape. At the end of the text word, an ASC II DC1 is recorded to represent a word end marker indicted as 360. Note that the first word of text is indicated on FIG. 6 as elements 353 through 360 and includes the spaces 353-355.

There are a number of different formats for speech data which can be employed depending on the type of speech synthesizer used in conjunction with this invention. A type of speech synthesizer designed for digital 8 bit input commands for synthesizing speech from phonemes is described in U.S. Pat. No. 3,836,717.

The next sequence of characters recorded on tape 8, FIG. 6a, are ASC II characters which represent the phonemes which make up the preceding text word. The phoneme notation illustrated here is in accordance with that suggested by O. R. Reddy, Journal of Acoustic Society of America, Vol. 44, No. 2, 1968. Other more detailed phoneme codes can be used which employ as many as 165 phomenes such as by W. A. Ainsworth, *A System for Converting English Text into Speech,* IEEE Transactions on Audio and Electroacoustics, Vol. AU-21, No. 3, June 1973. A marker character, ASC II designation DC2, element 361, is recorded to indicate the end of the phoneme speech characters. Immediately following DC2, element 361, recorded in ASC II code is the first character of the definition of the immediately preceding text word, (word 1 text is "city" 356-359) and the definition, "bit town" is recorded immediately following DC2. An ASC II code DC3 element 362 is recorded after the dictionary portion of the recorded data. Immediately following DC3 of word 1, at 370, shown on FIG. 6b, is the recorded word 2 text, followed in sequence by word 2 speech in phonemes representation, and then by word 2 dictionary. The end of the three parts of each recorded text word is marked by DC1, DC2, and DC3 respectively. Immediately following DC2 of word 3 speech, a symbol US, element 363, is shown as the recorded code indicated that the previous word of text has no definition recorded in memory. It is anticipated that definitions will not be provided for some words to conserve memory space. If such a word is selected for definition a tone or other indicator can be provided to indicate that no definition is available for such a word.

FIG. 6c illustrates the recording of the characters completing the first line of text. The "C" at element 364, is the 22nd character of text. Note that a "." is element 365 which is the end of the sentence. The tape data is formated for use with a standard U.S. TV receiver. Only 32 characters per line are used when the system employs a standard black and white or color TV set due to the limited video bandwidth of a standard TV receiver. If a modified TV set is employed, the tape and system can accommodate more characters per character line, i.e., 64 or more. Note that spaces are recorded 366-368, FIG. 6c, on the tape to fill the 32 character line before recording DC1, 369 the text end marker. Recording of spaces 366-368 may not be necessary since the standard character generator, to be explained later, will not modulate the video for a time slot in which it is not provided character commands or for which all data inputs bits are zeros. shown in FIG. 6d, the first element 372, is the line marker CR, which controls the loading of the RAM memory.

TEXT MEMORY LOADER

Figure 5:
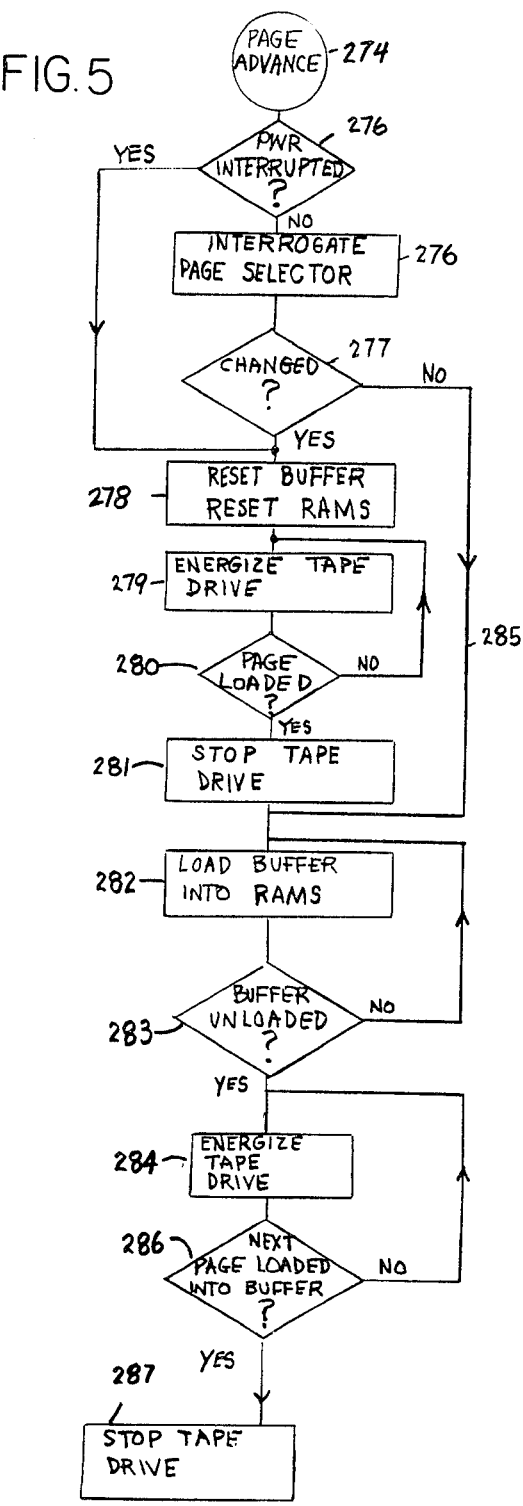
FIG. 5 is a program flow diagram for controlling the loading of data into temporary storage from bulk storage devices.

With reference to FIG. 2 and FIG. 5, one embodiment of a configuration for loading the data from the cassette tape, controllably into the temporary memory in the system is illustrated. The detailed procedure to be next described controls the unloading of the binary data or cassette for the appropriate page into the memories of the system and provides for RAM storage of one page in addition to the page being displayed. This is to permit the operator to immediately obtain the next page displayed upon activation of page advance switch 7.

Upon depression of the page advance button 7, load controller 57 initiates the program of FIG. 5. If the page selector 13 has changed since memory was previously loaded, or if power has been interrupted, all memory addresses are reset and memories 34, 35, and 36 are reloaded as illustrated in FIG. 5, steps 278-281. If the page selector is unchanged and there was no power interruption, the text address counter 37 is reset and the data loaded earlier into buffer memory 56 will be loaded into load bus 22', and the next page will be loaded from cassette 8 into buffer memory 56 as depicted in FIG. 5, steps 282-287. The marker word detectors examine the input data train 22' and catches the text words, the speech words and the dictionary words and loads into three RAMS 34, 35, and 36, respectively. When formating data as illustrated in FIG. 6, the data train on line 22 and 22' comprise a serial train of ASC II 8 bit pulses for each character of both text, speech and dictionary words. Each 8 bit character is clocked into their respective RAM storage 34, 35 and 36 by activating the write line on the appropriate RAM at the proper time.

Figure 20:
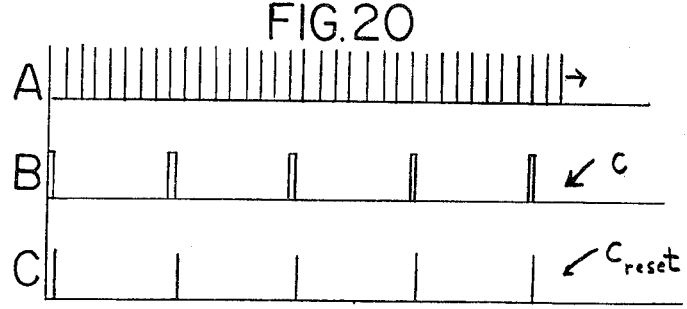

DC1 coincidence detector, 461, provides a pulse output on the arrival of a DC1 marker out of the buffer memory 56. Coincidence detector 461 also receives a C pulse from oscillator 19 which permits interrogation of the output of DC1 register 482 by AND gate 483 at the end of every character word. If all other inputs to AND gate 483 are in the one stage when the character pulse C occurs, AND gate 483 provides an output indicating that the word loaded into DC1 register is the DC1 marker. The DC1 register has its various stages connected to AND gate 483 so that all outputs connected to the AND gate 483 can only be in the one state if the sequence of 8 bits loaded into DC1 register corresponds to the bit sequence representing the DC1 marker. After receipt of each byte (8 bits), the DC1 register 482 is reset by th $C_{reset}$ 63 of oscillator 19, FIG. 20C. The DC2 coincidence detector 462, DC3 coincidence detector 487, so coincidence detector 500, and the CR coincidence detector 460 are each identical to coincidence detector 461 except that the register of each is appropriately connected to the internal AND gate so that they will uniquely decode only when the particular marker 8 bit word is received for which they are named.

The loading of text characters into text RAM 34, is initiated upon receipt by text latch 42 of a DC3/CR marker from OR gate 476 indicating the end of a dictionary word or beginning of a new line. DC3/CR marker is generated by DC3/CR character coincidence registers 487 and 460. For each new line, the line marker, CR, immediately preceding the first character of text, FIG. 6c, 372, serves the same text onset code function as DC3, dictionary end marker, FIG. 6a, 362. DC3 is not coded on the cassette tape at the end of dictionary characters if the next text entry starts a new line.

Upon receipt of the DC3/CR marker, text latch 42, FIG. 2, switches to true state and holds that position until reset by the DC1 marker. The text latch 42 is connected to AND gate 40. The other inputs to AND 40 is the oscillator 19 clock signal shown at FIG. 20A.

Accordingly, AND gate 40 will provide a write signal on line 43 and increment text address counter 37 synchronously with the clock signal in the interval between DC3/CR and DC1, until DC1 resets text latch 42. Text address counter 37 provides an address for the RAM text 34 organized in a 256×25 matrix. This storage is to accommodate the 256 bits/ line (2 characters/line×8 bits/character) and 25 lines of characters. Accordingly, one bit of each character of the ASC II data is written into RAM text 34 on each clock pulse following the DC3/CR marker. The text address counter 37 is incremented sequentially for each new clock pulse and the write command is delayed slightly in buffer 71 to permit the counter 37 to complete its carries and to stabilize.

Further with respect to FIG. 2 and FIG. 5, the functions of load controller 57 is loaded data from tape are now described. When the page advance command from switch 7 is received by the controller 57, the program of FIG. 5 is initiated. If the power has been interrupted, or if the page selector 13 has been changed since the last page was entered into buffer memory 56, the control causes the buffer memory address 76 and all RAM address counters 37, 38 and 39 to be reset after which the tape drive motor is energized via line 58 and it runs until the controller senses that the selected page has been reached. DC4 detector 20 activates the controller 57 to compare the next coded data word appearing on line 22 with the selected page code from page selector 13 and the controller 57 determines when the selected page is reached. When the selected page word is received a command is transmitted to reset memory address counter 76 and to buffer memory 56 on line 64 conditioning buffer 56 to load the selected page. Load controller 57, connected to the output of tape drive 12, includes an absolute value circuit for analyzing the tape output and providing an output pulse train having one positive going pulse coinciding in time to each positive or negative pulse on the tape output. The memory address counter 76 is incremented on line 59 by the output of the absolute value circuit, i.e., one counter step advance for each bit of data on the tape when writing into buffer memory 56. As soon as the indication of the next DC4 word is received from detector 20 by controller 57, tape drive 12 is stopped via command line 58. Controller 57 then again resets memory address counter 76 on line 75 and causes buffer 56 to serially unload its entire contents at the clock rate into line 22'. When unloading buffer memory 56, load controller 57 provides a counter output on line 59 and the read line 64 is made true. When the buffer is unloaded as determined by arrival of the next DC4 marker which is also connected to buffer output 22', controller 57 commands tape drive 12 on line 58 to be energized again in order to load the next page into buffer 56. Upon receipt of the next DC4 word as sensed by DC4 detector 20, controller 57 stops the tape drive. The tape loader is now prepared, upon the receipt of the next page advance command from switch 7, as shown on FIG. 5, to load the buffer 56 contents into the data bus. Unloading of the buffer 56 is fast so that the operator does not have to wait the relatively long time it takes to load the next page from tape into RAM memory.

SPEECH MEMORY LOADING

Following the detection of DC1 in the coincidence detector, 461, FIG. 2, the RAM text 34 loading is interrupted by disabling AND gate 40 since text latch 42 is reset when DC1 occurs. Simultaneously, speech latch 44 sets, in response to DC1, and AND gate 41 initiates the write command to RAM speech 35 through delay 65. AND gate 41 also increments speech address counter 38 for each bit of the ASC II bits representing the phonemes. Simultaneously, the address of the first bit of the first character of each speech word is stored in speech address RAM 46 by generating a write command in first speech character latch 47 which passed through delay 77 and enables one shot oscillator 73 connected to speech address RAM 46. The first speech character latch 47 is made true responsive to AND 41 output. Because the latch 47 does not change state again until the incidence of DC2 at the end of the speech data, speech addresss RAM 46 stores only the address for the first bit of each speech word. The line and word of text is the address in RAM 46 and the data stored is the address of the first bit of the first character for each word stored in RAM 35 as provided from speech address counter 38. The line/word binary code is received in speech address RAM 46 from coder 48 on line 49. The operation of coder 48, combines the output of the line register 21 and the word counter 50 to provide the line and word code of the text word stored in RAM 34 to which the speech word corresponds. When DC2 detector 462 output appears, the last speech character has been stored in RAM speech 35 and the write commands from AND gate 41 cease because speech latch 44 output becomes false. DC2 is also stored in RAM 35 and is employed in the playback to mark the end of the speech data.

DICTIONARY MEMORY LOADING

Following the detection of DC2 in the DC2 character coincidence detector 462, the RAM dictionary 36 is loaded. The bits of the characters of the dictionary words now appear on line 22' in ASC II code. DC2 detector output causes dictionary latch 51 FIG. 2 to set and causes AND gate 72 to initiate RAM dictionary 36 write commands through delay 52 and to increment dictionary address counter 39 synchronously upon advent of each clock pulse input to AND gate 72. In the same manner as the loading of the speech address RAM 46, the Dictionary Address RAM 53 has as its address the line/word code on line 55 from coder 48 of the corresponding text word and the data stored at that address in RAM 53 is the address in the RAM dictionary 36 for the first bit of the first character of the definition word(s).

The DC3 character is stored in RAM dictionary 36 as the last character of the definition. By storage of DC3 in RAM 36, the control of the retrieval of dictionary data from RAM 36 is simplified as will be explained in conjunction with FIG. 3.

TEXT DISPLAY AND DESIGNATED WORD RETRIEVE MODE

According to the previous discussion, the selected page of data from cassette tape 8 is loaded into the appropriate text, speech and dictionary RAM 34, 35 and 36. Each line of the text data comprises 32 characters and since each character is represented by 8 bits in ASC II code, each line employs 256 bits.

With reference to FIG. 3, a reset command is sent from display control 150 on line 101 to text address counter 37, FIG. 3., to commence the display of text upon signal from load controller 57 on line 68 that the selected page and the following page is loaded. Text address counter 37 also receives the increment command signals from AND gate 120 via AND gate 139. AND gate 120 provides 256 incrementing pulses to cause text address counter 37 to address text RAM 34. The AND gate 139 pulses also feed buffer 140 and sequentially cause text RAM 34 to feed one line of text characters out of text RAM 34 on 102 through control 150 to load into the character line buffer register 103. AND gate 120 is enabled when OR gate 125 provides a positive output. The first line of characters is read out of RAM 34 during vertical retrace when single shot MV 123 receives a vertical retrace (V) start command. The output of MV 123 is provided to AND gate 120 along with the display clock pulses. MV 123 pulse width is wide enough to permit at least 256 pulses of the display clock to be gated through AND gate 120 on line 124. Divider 121 disables AND gate 120 upon the occurrence of the 256th pulse by activating one shot multivibrator 160. One shot MV 160 has its output inverted so that AND gate 120 is enabled except when divider 121 indicates receipt of 256th pulse.

The second line of characters is loaded into character line buffer register 103 during the horizontal blanking period after the tenth scan line. The clock input to AND gate 120 must be fast enough to increment the 256 bit line out during the horizontal retrace period but need not be synchronized to the other clock oscillator pulses. The other input to OR gate 125 is provided from AND gate 122. Latch 130 provides an input to AND gate 122. After latch 130 sets, AND gate 122 is true when timing pules CV occur, except during the vertical blanking retrace interval, FIG. 14d.

With reference to FIG. 13f, it can be seen that H is a pulse which is equal in width to 112 pulse intervals of the clock F, FIG. 13a. H provides both the horizontal sync and horizontal blanking function. In the center of H is a higher amplitude portion of 32 F clock interval duration. This portion serves to synchronize the horizontal oscillator of the standard TV. H is at a 15720 Hz rate. The interval between H pulses is equal to 224 F oscillator intervals to satisfy the character generator timing. As will be explained subsequently, 32 characters per line×7 horizontal dots per character require the ability to provide 224 pulses synchronized to the horizontal sweep during the unblanked interval on each horizontal scan line of the TV set in order to control the character generator 105.

Figure 9:
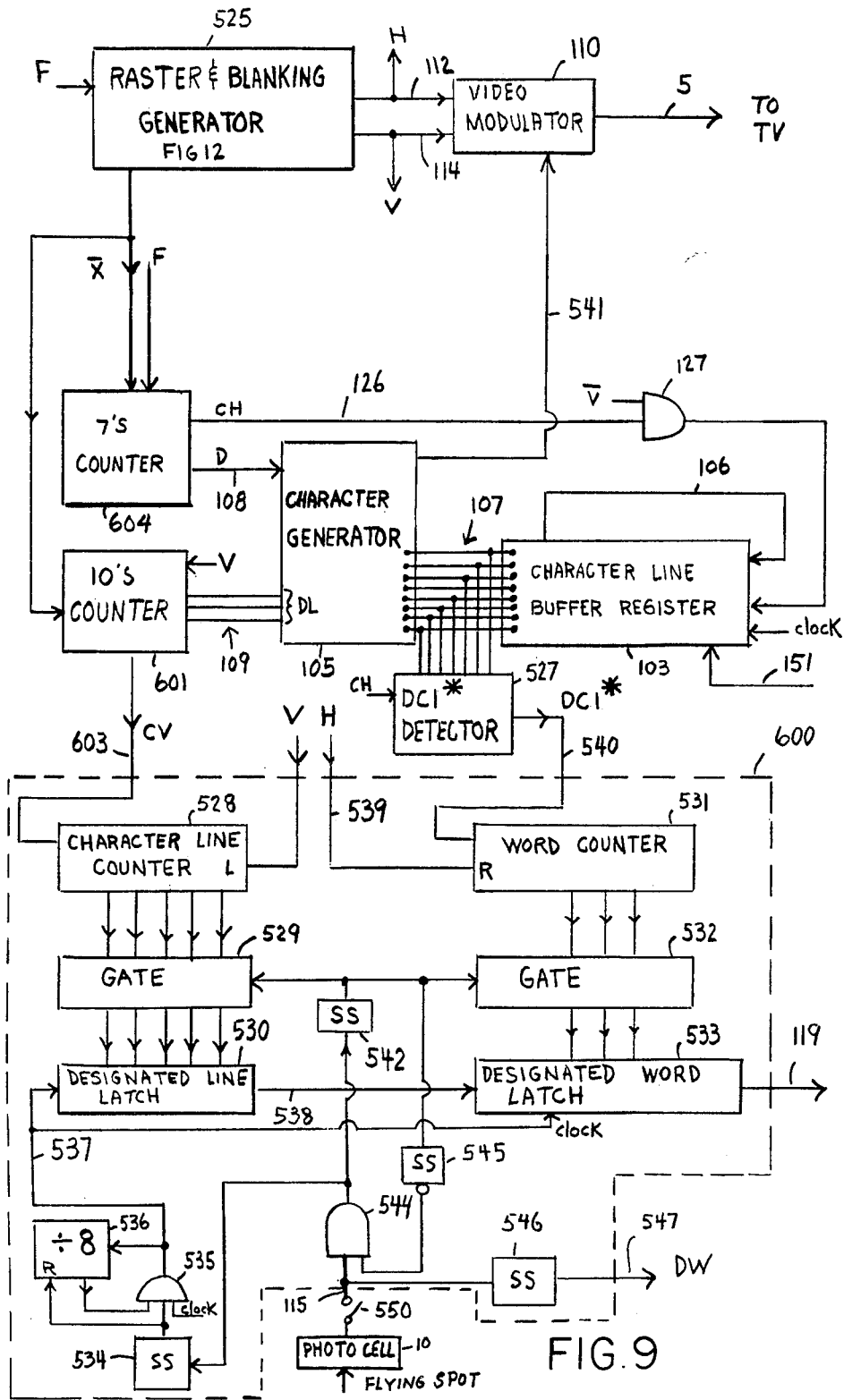
FIG. 9 is a schematic of a portion of FIG. 3.
Figure 10A:
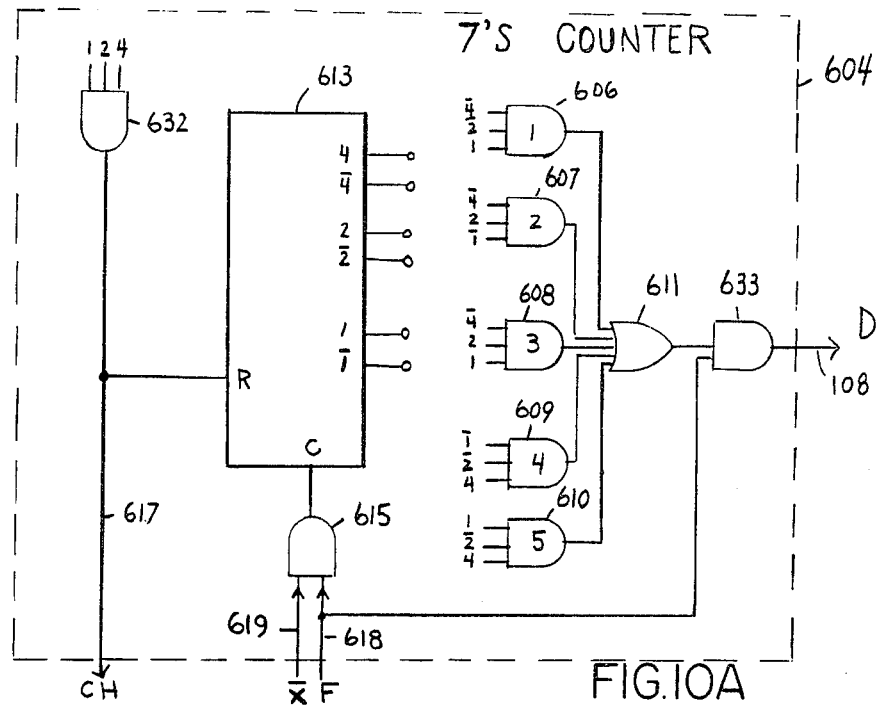
FIG. 10 is a schematic of portions of FIG. 9.
Figure 10B:
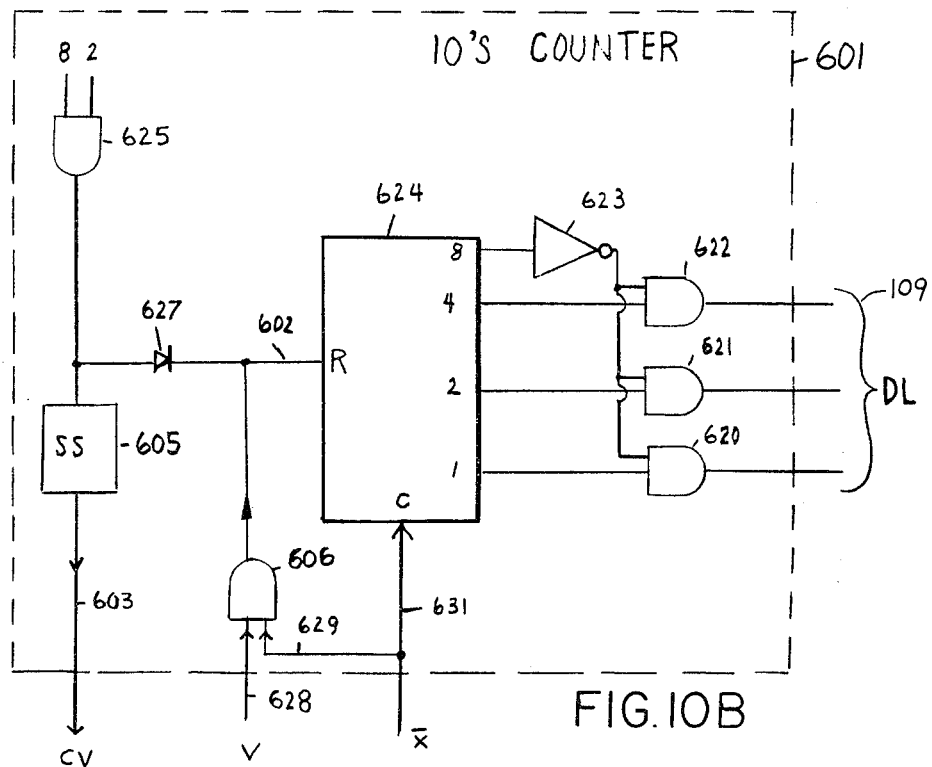

CV is a timing pulse provided from the 10's counter, 603, FIG. 10b. The 10's counter increments once for each $\overline{X}$ input, see FIG. 13d. $\overline{X}$ corresponds to the portion of the horizontal scan during display, i.e., between the horizontal blanking pulses, H. Output 603, FIG. 10, becomes true once every 10 pulses of $\overline{X}$. Accordingly, each character line is formed during ten horizontal scans. The character line buffer register 103 FIG. 3 also receives the clock CH from display timing control 113 via AND gate 127 on line 126 which commands the buffer 103 to feed the next character to the character generator 105. The operation of the character generator 105 is explained in conjunction with detailed description of FIG. 9.

The character generator 105 is a standard device. The character generator 105 is a decoder of ASC II code which, in conjunction with appropriate timing provides dots and undots within a 5×7 matrix for producing modulation of the TV scan to produce any character. Line 106 FIG. 3 provides the circulating feedback for the characters in the character line being displayed to keep them circulating in character line buffer register 103 seven times as will be described in more detail subsequently.

With reference to FIG. 9, the character generator 105 receives, in parallel, the ASC II word for each character indicated by ASC II 8 bits on lines 107. The character generator 105 also receives dot pulses D on line 108 and three lines from the 10's counter 601 designated DL on lines 109. During the $\overline{X}$ interval (the unblanked period in which horizontal scanning is taking place, FIG. 13d), the 7's counter, 604, provides dot pulses D, on line 108, which are five sequential pulses for each group of seven pulses of the F osc (FIG. 10a). The 10's counter 601 (FIG. 10b) provides the lines DL 109, which provide a binary representation of the 1st seven lines of each group of ten horizontal scan lines (FIG. 10). The character generator 105, provides a series of dots or undots output on line 541 for controlling the video modulator 110 which provides on line 5 the intensity modulation control signal to the CRT of TV set 2. By virtue of the fact that the raster and blanking generator 525 supplies a horizontal sync signal H, 112, of 15720 Hz and a vertical sync V, 114, of 60 Hz to the modulator, each frame of video data overlays the previous frame and there is no interlacing of the TV scan. At the completion of the 250th horizontal scan line, which is the end of the 25th character line (since each character line occupies 10 horizontal scan lines), the vertical retrace V, is issued by raster and blanking generator 525. During the vertical blanking inverval, gate 122 FIG. 3 is disabled, so that the text address counter is not incremented during the vertical blanking. Additionally, character line buffer register 103 FIG. 3, is not incremented during the vertical blanking because the CH input line 126 is disabled by AND gate 127 upon the occurrence of the vertical blanking.

At the end of the vertical blanking interval, AND gate 122, FIG. 3, is again enabled causing the text address counter 37 to recall the first 256 bits from text RAM 34. Since the text address counter 37 is reset on line 101 and the address to RAM 34 is repeated on commencement of each vertical scanning frame and the TV picture is refreshed each 1/60 sec. On each $\overline{X}$ which occurs during the vertical blanking interval the 10's counter reset line 602 is energized, FIG. 10b via AND gate 606 and delay 605. Even though the 10's counter continues to count during the vertical blanking interval, the 10's counter will be in the reset state at the end of the vertical blanking interval.

DESIGNATED SPEECH FUNCTION

Further with respect to FIG. 3, for purposes of explanation, assume that the operator of the inventive system is viewing the TV screen 2 and is reading the text data displayed thereon and comes upon a word for which the sounding is desired. The desired word may be designated for sounding by placing the light pen 10 directly on the TV screen portion overlaying any portion of the word to be designated for speech. To guard against receipt of unwanted pulses, the light pen is preferable provided with a depressing switch 550, FIG. 9, such that when the light pen is pressed on the TV screen the switch 550 closes and permits the photocell to pass a pulse indicating receipt of the flying spot. A pulse is generated in light pen 10 which corresponds in time to the instant that the scanning electron beam impacts the phosphors on the screen immediately beneath the light pen 10. This pulse, provided on line 115, is sent to the designated word address detector 600. The designated word address detector 600 is also provided with four timing signals V, CV, H and DC1. The operation of the designated word address detector 600 is explained subsequently in conjunction with the discussion of FIG. 9. The output of designated word address detector 600, on line 119 is a digital code representing the line and the word on that line of text corresponding to the designated word, for example, line 3, word 6. The code of the signal on line 119 is formed in the same format as the output of coder 48, FIG. 2. This permits the direct use of the output 119 of designated word address detector 600 to retrieve the address for the designated word from the memory 46 storing the address of the first bit of each word of the speech data. The output of 600 is connected through system control 150 to line 117 to the speech retriever and synthesizer 118.

Figure 4:
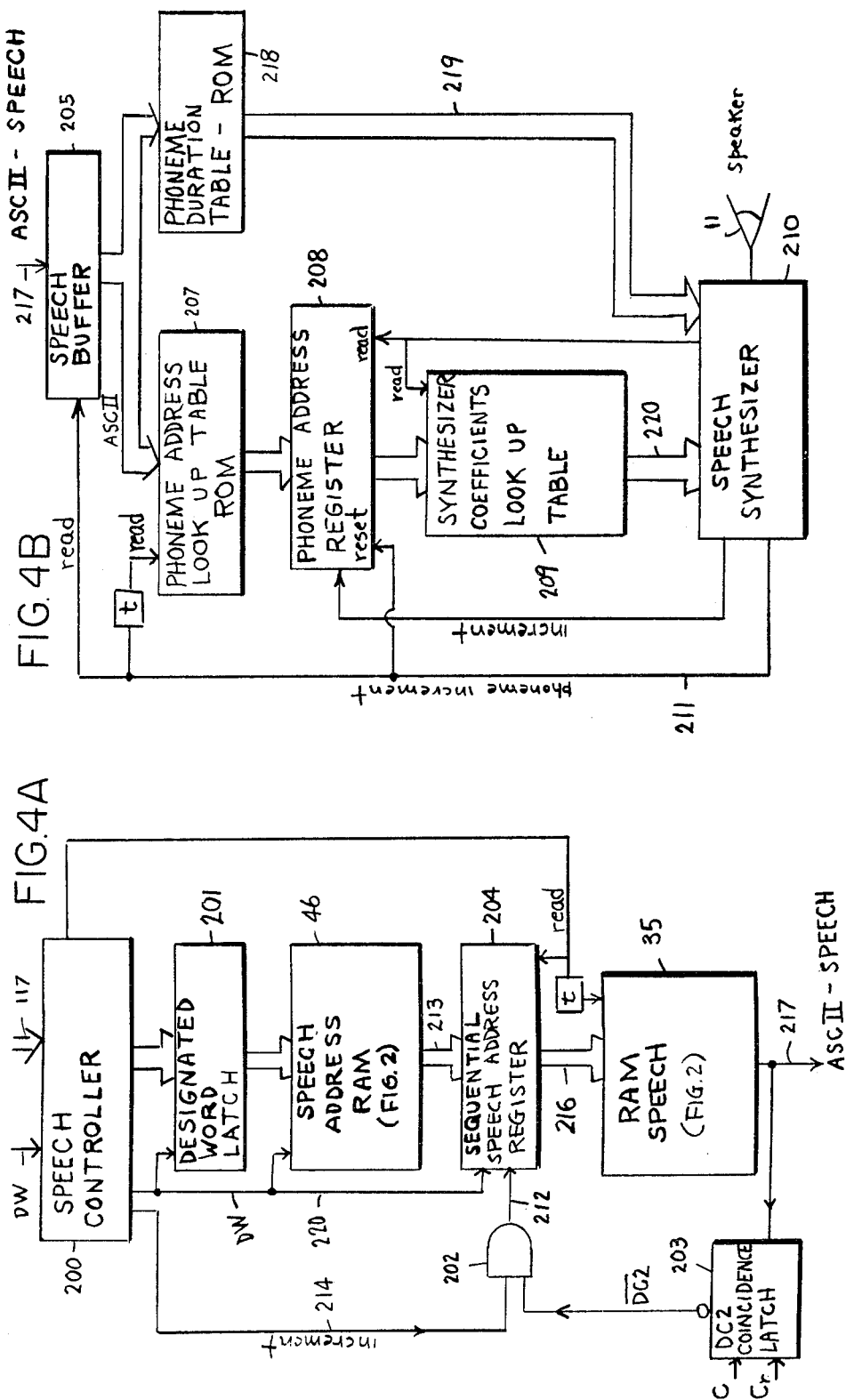
FIGS. 4A and 4B are block diagrams of an embodiment of the system employing phenomes for vocalizing of a designated word.

With reference to FIG. 4a, the designated word address is provided to designated word latch 201 on line 117. Designated word latch 201 has a parallel output which addresses speech address RAM 46. Earlier, speech address RAM 46 was caused to store the address of the first bit of the first character of the speech phonemes stored in speech RAM 35. Accordingly, speech address RAM 46 provides a matrix serving as a look up table. For every word in the text of the page being displayed for which speech data is formated, speech address RAM 46 provides the address in the RAM/speech 35 of the first bit of the first character of the corresponding speech phonemes. Hence, when speech address RAM 46 is addressed with the code for the designated word (line and word), the output on lines 213 is the address of the first bit of the first character of the designated word stored in RAM/speech 35 and provides the initial setting to which sequential speech address register 204 is set. Since the phonemes stored in RAM/speech 35 are ASC II 8 bit words stored sequentially, it is possible to increment the sequential speech address register 204 after each read command from speech controller 200 and thereby cause RAM/speech 35 to sequentially provide the ASCII representation of each phoneme character to speech buffer 205 (FIG. 4b) on line 217. The DW output 220 of speech controller 200 is provided to the read gate on designated word register 201, to read gate on speech address RAM 46 and to the reset input to sequential speech address register 204 to initialize these circuits. A speech end marker DC2 coincidence latch 203 is in parallel with output 217 of RAM speech 35 and causes the AND gate 202 to cease increment commands to sequential speech address register 204 as soon as DC2 is detected on line 217. The phoneme characters are now stored in buffer 205, FIG. 4B, and are read out of the buffer by commands via line 211 from the speech synthesizer 210. In the embodiment illustrated, the ASC II phoneme representation is caused to address a phoneme address look up table RAM 207 which causes phoneme address register 208 to address the synthesizer coefficients look up table ROM 209. ROM 209 provides the parameters to the speech synthesizer to control the creation of the audio output. In one embodiment, the ROM 209 provides the data for the control parameters for a multistage filter such as illustrated in block diagram FIG. 11b. Various speech synthesizers appropriate for this application are described in the literature and in issued patents, such as U.S. Pat. No. 3,836,717. Model CT-1 speech synthesizer is marketed by Computalker Consultants, Santa Monica for ASCII phoneme interaction. The phoneme duration table 218 provides commands to the synthesizer 210 on line 219 so that a new phoneme is read in at the end of the phoneme duration and the parameters are provided to the synthesizer on line 220. The synthesizer causes speaker 11 to provide the audible synthesized speech.

A slightly different embodiment employs look-up table 209 to store in digital form the amplitude vs. time representation of each phoneme. The output on line 220 of such an embodiment could be used to drive a speaker 11 through an A/D converter in synthesizer 210.

The word designator of FIG. 1B can also be used in the place of the light pen 10 of FIG. 1. The student has two knobs on the control 10' in which he can select the line and word which is desired for sounding or definition. This requires the student to count out the line and word from the visual display which is not as quick or convenient as the preferred light pen.

LPC SPEECH SYNTHESIS WITHOUT ASC II PHONEME CODING

A further alternative which is not illustrated does not use phoneme representation storage but stores on the bulk storage medium, i.e., tape 8, each word of text directly in Linear Prediction Coefficients (LPC). If sufficient RAM speech storage is available, the LPC digital data for each page can be stored directly. However, this implies a bit rate of approximately 2400 bps for speech data and for a text page of 150 sec. audible duration requires large storage capacity.

Figure 8:
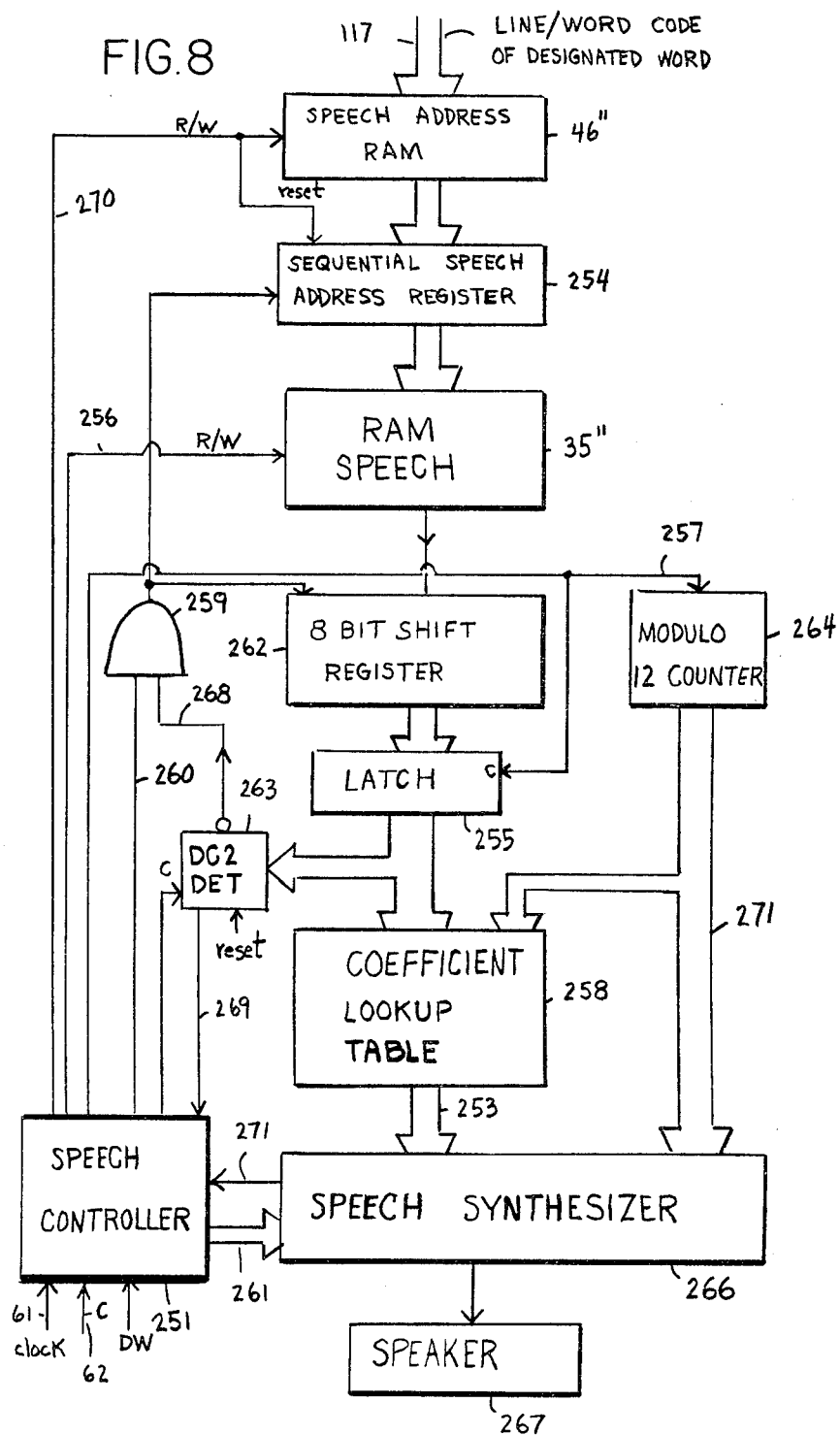
FIG. 8 is a block diagram of another embodiment employing compressed LPC representation for retrieval and vocalizing of a designated word.

An implementation is described in conjunction with FIG. 8 which requires less memory than full LPC representation. It has been determined that the LPC coefficients can be approximated by linear interpolation between the values of the LPC parameters at phonetic boundaries between steady state and transition regions. According to this technique, each word is converted to LPC coefficients and analyzed for phonetic boundaries. By specifying the value of the LPC parameters at the boundaries and the time duration between the boundaries one can substantially reduce storage requirements. The LPC synthesizer then interpolates the LPC coefficients on a linear basis between boundaries. This technique has been described by Olive and Spickenagel, *Speech Resynthesis From Phoneme Related Parameters*, J. Acoust. Soc. Am. Vol. 59, No. 4, April 1976, P. 993. This technique enables parameter specification at the rate of approximately twice per phoneme and although the synthesizer continues to operate at high rate, i.e., updating bits every 2 milliseconds by interpolation between target values, the synthesizer is provided the specification of the time between transitions and the target value of the parameter and is caused to linearly interpolate between these variably displaced targets. This implies an approximate bit rate of 1100 bps assuming the average phoneme is 150 milliseconds, two transitions per phoneme, 8 bits for time duration and 70 bits for all coefficients per update. In FIG. 8, the line/word code 117 of the designated word is an input to speech address RAM 46" to retrieve the address in memory 35" of the designated word for the LPC code and time durations. The address output of RAM 46" is loaded into sequential speech address register 254 for addressing RAM speech 35". The sequential speech address register 254 is advanced and sequentially addresses the rest of the bits of the LPC code of the designated word by applying pulses on speech clock line 260 from speech controller 251 to AND gate 259. The pulses on line 260 advance the bits in RAM speech 35" into shift register 262 which holds one byte (8 bits) of speech data. The 8 bit parallel output of shift register 262 is coupled to the input of latch 255. By means of a pulse on line 257 the 8 bit word from shift register 262 is transferred via latch 255 to DC2 detector 263 and to coefficient lookup ROM 258. A pulse on line 257 from speech controller 251 is also applied to modulo 12 counter 264 thereby advancing it by one count. The output of modulo 12 counter 264 is applied to speech synthesizer 266 and forms part of the address input of coefficient lookup ROM 258. Modulo 12 counter 264 indicates which one of 12 bytes of each frame is being applied to speech synthesizer 266 on line 253. The signals on line 253 are the coefficients of the LPC code and time interval data in a form that can be readily interpreted by speech synthesizer 266.

The speech synthesizer 266 sends a frame command signal on line 271 to speech controller 251 to inform the controller that the next frame of coefficients should be loaded into the speech synthesizer. The speech controller sends the pulses on line 260 responsive to the frame command signal on line 271. The output signals of speech synthesizer are applied to speaker 267. As in the previous example, a DC2 marker is used to indicate the end of speech data. The DC2 detector 263 does not need an internal register since latch 255 provides an 8 bit parallel output for a sufficient time to interrogate all bits simultaneously. When a DC2 marker is detected by DC2 detector 263 a false signal appears on lines 268 and 269 halting any further clock pulses from being transmitted by AND gate 259 to address register 254 and shift register 262. The signal on line 269 is coupled to speech controller 251 thereby halting further speech.

Each of the embodiments of FIGS. 4A/B and FIG. 8 employ data compression techniques to reduce the RAM storage requirements. FIGS. 4A/B code the input data in ASC II words representing the limited number of phonetic soundings of the spoken language and, subsequently employ ROM look up tables to provide the coefficients for controlling the speech synthesizer. The configuration of FIG. 8 effects compression by coding synthesizer coefficients on the input data only for transition points, thereafter relying on calculation and interpolation between these targets. Both of these systems require difficult and time consuming human preparation of the originally coded data in order to obtain natural sounding speech. A preferred system would eliminate the requirement for human intervention in the coding of the data for speech synthesis. The preferred embodiment of this invention, described in connection with FIGS. 16-19, does not require a phonetic expert to code the speech word, or an engineer to determine from spectrum analysis where the transitions in the filter coefficients occur. Speech coding can be automatically obtained by inputting the sounds to be coded into a linear predictive encoder which operates as described by Makhoul, *Stable and Efficient Lattice Methods for Linear Prediction*, IEEE Transactions On Acoustics, Speech And Signal Processing, Vol. ASSP-25, No. 5, October 1977, to determine the predictor coefficients. These coefficients are then recorded on the casette tape 8 for each word for which an audible sounding is desired. Accordingly, the embodiment of FIGS. 16-19 stores all the speech data in the form of LPC reflection coefficients for direct control of an LPC speech synthesizer. The functional block diagram of such a synthesizer is illustrated in FIG. 11a. To support this tecnique, the LPC digital data to generate a page of speech data must be stored in RAM. This requires a fairly large memory capacity. For example, a commercial LPC speech synthesizer, the Texas Instrument TMC 0280 speech synthesizer, requires update of speech coefficients every 20 msec. Each frame includes 48 bits. Accordingly, the bit rate is $48 \times 50 = 2400$ b/s. At this rate, 50 seconds of speech requires 120,000 bits. Saving can be made in the memory requirement for the teaching aid application because many familiar words of the text can be designated not to be coded for speech. In reading aid applications, it is estimated that half the words or approximately 25 seconds of speech per page needs to be coded for speech, reducing the LPC speech memory requirement to less than 64K bits per page.

Figure 16A:
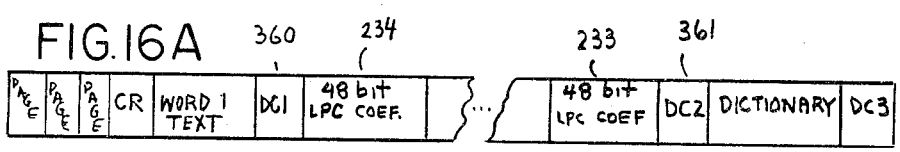
FIG. 16 is an illustration of the input signal format of the preferred embodiment of the invention.
Figure 16B:
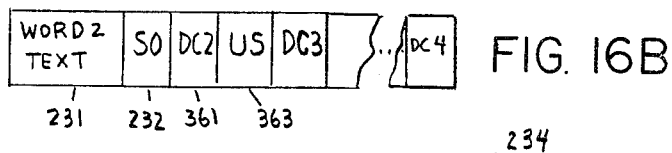

This preferred embodiment is described with reference to FIGS. 16-19. FIG. 16 describes the format employed for the preferred LPC speech coding. In this embodiment, the coding of FIG. 16 differs from the coding of FIG. 6 in the interval from DC1 element 360 through DC2 element 361. Similarly to FIG. 6 coding, words of text which are also coded for speech are ended with a DC1 marker. Following the DC1 marker is a long string of bits of 48 bit frames, which comprise the digital representation of the coefficients for controlling the LPC speech synthesizer. Each word includes bits for coefficients $K_1$ through $K_{12}$ as disclosed in FIG. 17. For most LPC synthesizers, each of the coefficients have different accuracy requirements. For example, the Texas Instrument TMC 0280 employs a 48 or 49 bit format where the coefficients $K_{10}$-$K_1$ are the coefficients for the 10 stage digital filter and generally require an increasing number of bits as the stages decrease and $K_{11}$ and $K_{12}$ are pitch and gain parameters.

As illustrated in FIG. 16, word text element 231 is followed by a SO code 232. SO is a text word end marker which has all the functions of DC1 and some additional functions. SO is interpreted by the system to cause the synthesizer to provide a short audible tone indicating to the operator that the designated word of text is not coded for speech. The SO marker 232, is followed by DC2, 361, the speech word end marker which controls functions as previously described with respect to initiation of the dictionary word storage. In this example, the speech end marker DC2, 361, is followed by a US marker, 363 which is interpreted by the system as an indicator that the preceeding text word is not provided a definition in dictionary RAM.

Figure 17:
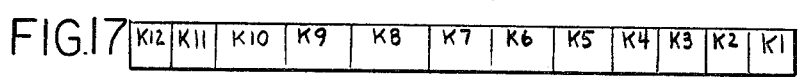
FIG. 17 is an illustration of the format of a portion of the input signal of FIG. 16.
Figure 18:
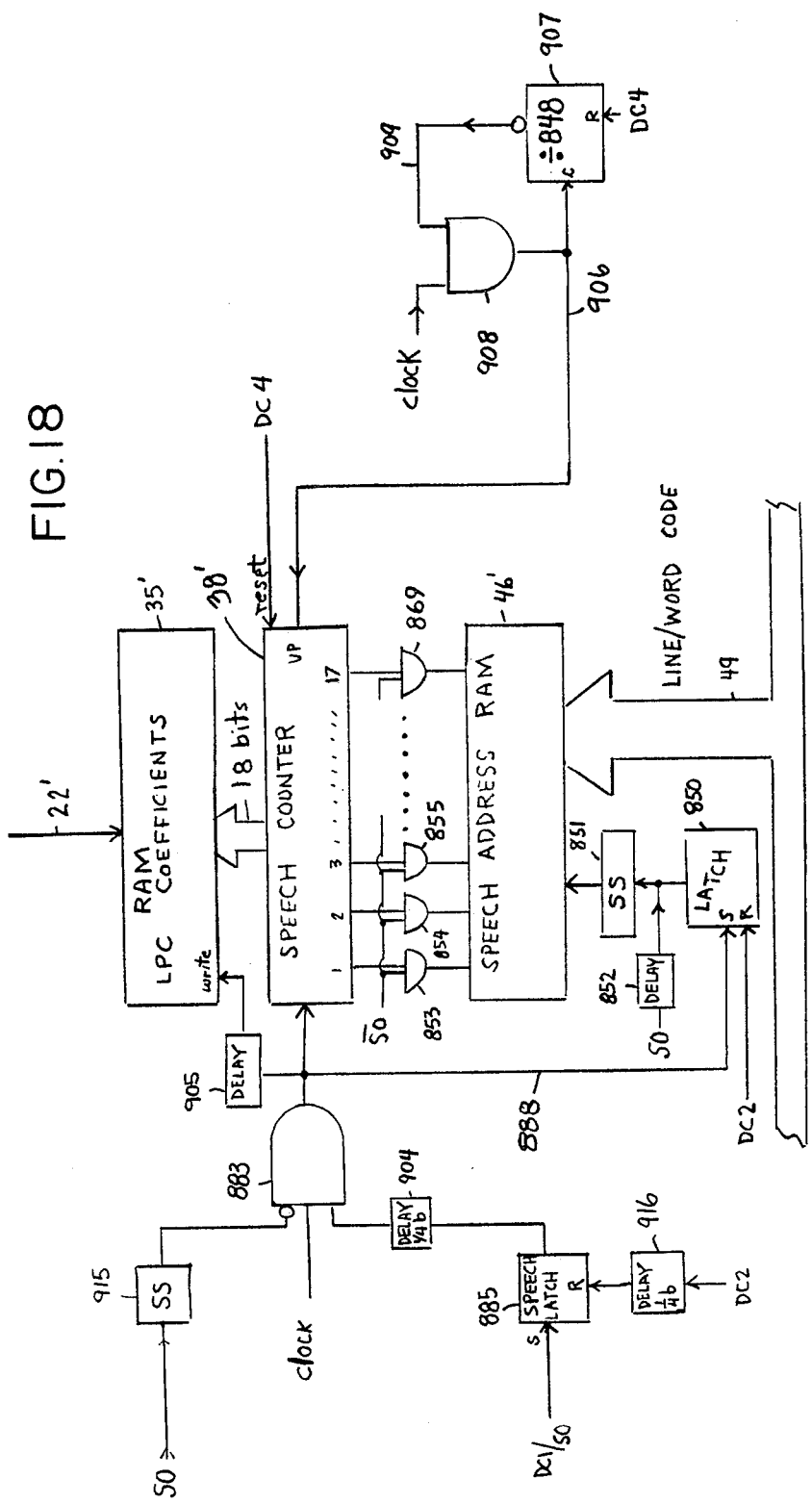
FIG. 18 is a schematic of a portion of the preferred embodiment of the system for recording full LPC coefficients for speech for data in format of FIG. 16.

With respect to FIG. 18, an embodiment is described for storage of speech data when speech is coded in LPC code on the tape 8 in the format illustrated in FIG. 16 and FIG. 17. The buffer memory 56, as previously described, provides the speech data in serial form to line 22', and thence to speech RAM 35'. The LPC coefficients are stored in RAM 35' at the addresses commanded by speech counter 38'. Speech counter 38' is incremented by the inputs from AND gate 883. DC1 sets speech latch 885 which provides an enable command to AND gate 883 through delay 904. The clock pulses applied to AND gate 883 are passed through to the speech counter 38' and to the write command of the RAM 35' through delay 905. Assuming the speech RAM 35' is a 128K bit storage, and the speech counter 38' is an 17 stage register, each clock pulse advances the register 38' one bit and the register provides a unique 17 bit address which causes each bit to be sequentially stored in RAM 35' in a unique location corresponding to the 17 bit address. Upon appearance and sensing of DC2, speech latch 885 is reset, storage of data from line 22' ceases although DC2 is stored in RAM 35'.

In the same manner as previously described with respect to storage of phonemes, the speech address RAM 46' is caused to store the address of the first bit of LPC coefficient data corresponding to the line and word of text immediately preceeding.

The first clock pulse output of AND gate 883, is sent to energize latch 850 via connection 888. Latch 850 causes single shot multivibrator 851 to activate storage, in speech address RAM 46', of the 17 bit output of speech counter 38' at a location corresponding to the 8 bit address representing line/word on line 49. Accordingly, speech address RAM 46' stores the address in RAM 35' of the first bit of LPC code for any word which has its LPC coefficients stored in RAM 35'. This enables retrieval of the starting address of each designated word stored in speech memory as will be subsequently described.

In order to conserve storage in RAM 35', provision is made for providing a 300 msec tone whenever the operator designates a text word for vocalizing which is not coded for speech. As described with reference to FIG. 16, an SO marker 232 takes the place of the DC1 marker whenever the immediately preceeding text word is not coded for speech. With reference to FIG. 18, AND gate 883 is disabled by SO, hence, speech counter 38' is not advanced upon occurrence of SO. However, $\overline{SO}$ is one input to the 17 AND gates 853-869 connected to the output of speech counter 38'. SO is also provided to single shot MV851 which causes speech address RAM 46' to store the output of AND gates 853-869 as the text word address corresponding to the line/word code on then appearing input 49 to speech address RAM 46'. When SO appears, the outputs of AND gates 853-869 are zeros. This technique enables every designated word for which the speech function is not to be provided to have an all zero code stored in speech address RAM 46'. RAM 35' is caused to have previously fixed storage therein of 15 frames of 56 bit words starting at zero position in which only the pitch and gain coefficients are non-zero. Since the coefficients for all the stages of the digital filter are each coded to be zero in these first 15 frames, the excitation to the filter as determined by the pitch and gain coefficients pass through the filters without modification and produce a steady frequency tone in the synthesizer speaker output. Since the 15 frames are called up at a frame rate of 20 msec, the tone is 300 msec in duration. At the start of each new page, when all RAM is reset, the speech counter 38' is caused to step to position 848 (56×15+8) so that no data is commanded to be stored in those first 15 frame positions of RAM 35'. RAM 35' can be made to permanently store the tone data in the first 848 bits, or alternatively, ROM can be used to load RAM with the data for the tone after any power interrupt. The reason for employing a 56 bit frame will be explained subsequently. The extra 8 bits is to store the 8 bit DC2 stop code for speech stoppage. At the start of each new page of text, a start reset or DC4 on line 914 is provided to MV 910 to provide a pulse long enough to permit 848 clock pulses to be passed through to speech counter 38' on line 906. Counter 907 disables AND gate 908 with the 848th pulse is passed.

In response to the operator's selection of a text word for audible sounding which initiates a designated word command, the string of LPC coefficients defining the designated word are retrieved from RAM 35' and provided to the synthesizer. The block diagrams in FIG. 19 enable retrieval of the LPC data from RAM 35' and conversion of the 48 bit frame LPC coefficient data in a form acceptable to the Texas Instrument TMC 0280 speech synthesizer. However, it is understood that the invention is not so limited and can be adopted to work with any speech synthesizer.

Figure 19:
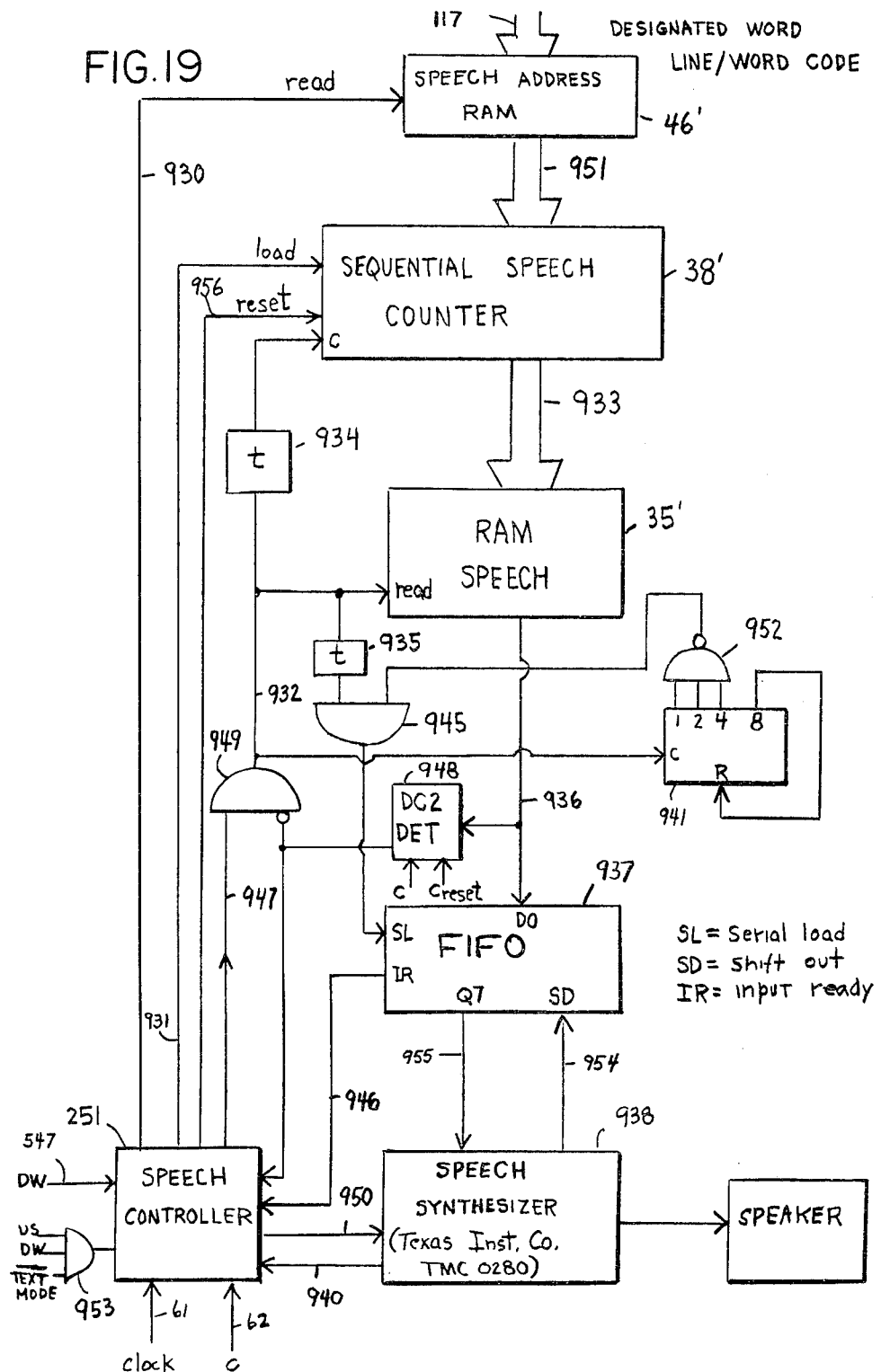
FIG. 19 is a schematic of the speaking portion of the preferred full LPC embodiment of the system of retrieval and vocalizing in an LPC synthesizer.

With reference to FIG. 19, DW is connected to speech controller 251. The occurrence of a DW pulse on line 547, originating from FIG. 9, signals to the speech controller 251 to commence the speech function. A read command 930 to speech address RAM 46' causes the designated word code 117 to address RAM 46'. The output of RAM 46' is the address of the first bit of speech data for the designated word. At the same time that the read pulse on 930 is sent, a load signal 931 is sent to the sequential speech counter 38' to cause it to initialize on the output commanded by speech address RAM 46'. The speech controller 251 now begins to provide pulses on 947 which are coupled through AND gate 949 and then activates the read command of the RAM speech 35' and advances the address specified on 933 by sequential speech counter 38'. After output 936 of RAM speech 35' stabilizes, time delay 935 passes the read pulse to the SL (serial load) input of the FIFO register 937. FIFO stands for First In, First Out register which is an 8 bit × 32 stack register which functions as a buffer and permits input and output to be accessed independently at differing rates. FIFO 937 is a device such as AM 2812, made by Advanced Micro Devices, Sunnyvale, CA, which permits serial loading and unloading. The 8 bit words move automatically, in parallel, through the FIFO to the output and can be shifted out serially out of Q7 by pulsing the SD input.

There is a preferred way to format the LPC data. The LPC data is stored in the bulk store cassette in a string of 8 bit words where the 7th bit is a marker bit which is always 1. This technique of coding enables ASC II markers and ASC II page numbers which need to be stored and used along with the LPC coded data to be discriminated since the ASC II markers and numbers are all 8 bit words wherein the 7th bit is a zero. Since the LPC information in bulk storage and in RAM speech 35' contains this one marker bit which carries no coefficient information, the marker must be removed before the coefficients are input to the speech synthesizer 938.

Removal of the marker bit is achieved by means of counter 941 and NAND gate 952. Read pulses on line 932 are coupled through delay 935 and AND gate 945 to the serial load (SL) input of FIFO 397. Read pulses on line 932 are also coupled to counter 941 which in combination with NAND gate 952 provides an inhibit pulse to AND gate 945 every seventh pulse for each byte. This arrangement permits the 8th bit of every byte to be inserted in place of the 7th bit, thereby excluding the 7th bit of each byte from FIFO 937. Responsive to clock signals on line 954, FIFO 937 advances the LPC parameters into synthesizer 938 on line 955. The TI TMC 0280 provides a 48 bit burst on line 954 every 20 msec.

AND gate 953 is employed to generate a signal tone to the operator whenever a word is selected for dictionary display which is not coded for display. AND gate 953 receives the DW signal, (FIG. 9), the $\overline{text}$ mode signal (FIG. 3) and the US coincidence latch signal (FIG. 3, 152). With these inputs, the speech controller 251 goes through the sequences earlier described except that the read command on 930 to speech address RAM 46' is never sent and a reset on line 956 is sent to sequential speech counter 38'. Therefore, output 933 from sequential speech counter 38' starts at all zeros. As explained earlier in respect to FIG. 18, the first 848 bits of RAM 35' are coded with 15 frames of data coded to provide a constant tone. Accordingly, when a word is selected for definition for which no definition is recorded, the first 15 frames of data from RAM speech 35' are sent to the speech synthesizer 938 providing a signal tone until stopped automatically on sensing of DC2 in DC detector 948.

CHARACTER GENERATOR AND DESIGNATED WORD ADDRESS DETECTOR (FIG. 9)

Figure 15:
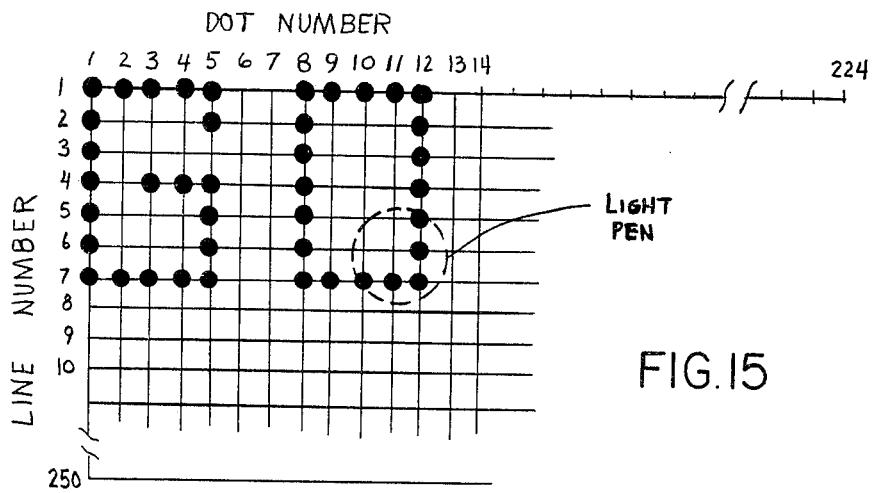
FIG. 15 is an illustration of the dot formation of symbols by a character generator in conjunction with a TV screen.

With reference to FIG. 9, the block diagram is illustrated within dashed lines for the designated word address detector 600 and its interconnections to the character generator circuits. The raster and blanking generator 525 provides the $\overline{X}$ timing pulse (FIG. 13d) to the 7's counter 604 and 10's counter 601. The 7's counter provides the train of dot pulses, D, to the character generator 105 on output 108. D is a series of five sequential pulses out of each seven sequential F pulses. The character line buffer register 103 is a 256 bit register which advances 8 bits on each command CH on line 126 coupled to the 7's counter through AND gate 127. This provides a new character to the character generator for each 7 pulses of the F oscillator. With reference to FIG. 15, assume that the first character provided in ASC II code to the character generator represents the letter "G". The character generator also receives from the 10's counter 601 a line command on the three lines 109. When the character generator receives a "line 1" command from the 10's counter (only the DL line representing the least significant binary number is in the high state), the character generator 105 translates this command to instruct it to generate the first five dots of the dot pattern designated line No. 1 in FIG. 15. For a "G", the character generator passes each of the 5 dots received on the D line to the video modulator 110 on line 541. As the horizontal scan continues, since there were no dots presented from the 7's counter on the D line for the 6th and 7th F pulse, two spaces (or undots) are created. As soon as the 7th F pulse is counted in the 7's counter the CH command is issued and the buffer register 103 is caused to advance the next 8 bit digital word representation of the next character to the register position where it is provided on outputs 107 to the character register. With reference to FIG. 15, if the second character is the letter "O", the next 5 F pulses create five sequential dots on line 1 designated points 8-12. As before, points 13 and 14 are undots. This process continues until all 32 characters in the line are interrogated and the dot pattern for line 1 is determined and provided on line 541 to the moduator 110 and caused to appear on the TV screen. When the 224th dot space is completed, the horizontal blanking and synchronizing pulse, H, is generated. The H pulse is 112 F osc pulse intervals in duration permitting sufficient time for the electron beam to be returned to the left side of TV screen. When the next $\overline{X}$ pulse appears, the 10's counter 601 increments to position 2, and sends DL commands to the character generator 105 to provide the dot sequence for the second scan line. Since character line buffer register has recirculated the bits representing the line of characters, the first character is now again being presented to the character generator. For line 2, the character generator, with reference to FIG. 15, is seen to provide output pulses at position line 2 dot 1 and line 2 dot 5. The character generator also received 5 dots from the 7's counter during this interval, but since it is commanded to generate a "G", it provides only dots 2 and dots 5 for line 2 of a "G". This sequence continues through 224 dot spaces through the 7th line.

No dots are generated on the 8th through 10th scan lines to provide interline spacing since the 10's counter 601 provides no DL line commands to the character generator for those lines. The 10's counter is arranged to increment on each $\overline{X}$ timing signal but to provide 7 sequential commands for only the first seven of 10 $\overline{X}$ pulses and to reset on the 10th timing signal received. Upon receipt of the 10th timing signal $\overline{X}$, the 10's counter generates a CV command on line 603, (see also FIG. 10b) which initiates, during horizontal retrace, the loading of a new line of characters in buffer 103 as explained earlier in reference to FIG. 3.

When the operator of the system desires to hear the pronunciation of any word of text appearing on the TV screen, the word designator photo cell 10 is placed directly over the area of the desired position on the TV screen. As seen on FIG. 15, the area within the circle designated "light pen" is assumed to be the area underlying the photocell. It can be seen that the area is large enough to receive light from at least one phosphor area which is excited during line scanning. The photocell provides a pulse output responsive to each dot which is created in its underlying area. When switch 550 is closed, AND gate 544 receives photocell output from line 115. Upon receipt by AND gate 544, FIG. 9, of the first pulse on photocell output, the one shot multivibrator 542 generates a pulse to activate gates 532 and 529 and one shot mutivibrator 545. Multivibrator 542 generates a pulse which energizes gates 529 and gates 532 which loads the bits appearing in character lines counter 528 and word counter 531 into the designated line latch 530 and designated word latch 533 respectively. Multivibrator 545 is also energized and disables AND gate 544 for the duration of the MV 545 pulse. MV 545 is a relatively long pulse and disables AND gate 544 so that the designated word address can be generated only once a second. The character line counter 528 increments upon receipt of each CV pulse appearing on line 603 from the 10's counter 601 and is reset upon appearance of each vertical blanking and synchronization pulse V from the raster and blanking generator 525. Upon appearance of the V pulse, the character line counter 528 is loaded to one to indicate that the first character line is in progress.

The word counter 531 increments upon receipt of each DC1* on line 540 from the DC1* detector 527. The DC1* detector 527 examines the binary bits being presented to the character generator 105 and provides an output for any DC1 or SO on lines 107. DC1* will appear once for each word on each horizontal scan. The word counter 531 is reset by horizontal blanking pulse on line 539 so that counter 531 is reset to one at the end of each scan line.

When switch 550 is activated and the photocell 10 produces a pulse which appears on the output of AND gate 544, the one shot MV 534 is also energized. MV 534, AND gate 535 and divider 536 cooperate to provide 8 clocking pulses on line 537 to serially read out the designated line latch 530 and designated word latch 533. Since designated line latch 530 and designated word latch 533 are connected in series by connector 538, a serial 8 bit pulse train appears on output 119 which comprises a combined code indicating the line and position of the designated word. This embodiment employs 25 lines of characters, which can be represented by 5 bits. A line of text is controlled on original storage so it does not exceed 8 words. Accordingly, in this embodiment any word on a line is uniquely identified by 3 bits. Thus, the combined designated word code on 119 is an 8 bit code wherein the left most bits are the line code and the right most bits are the word position code.

7'S AND 10'S COUNTER

With reference to FIG. 10A, the logic diagram for the 7's counter 604 is shown. The 7's counter comprises a 3 stage counter 613 which is reset via AND gate 632 whenever the first, second and third stage are in the true state indicating the receipt of seven incrementing pulses. The inputs to AND gate 632 are the first stage true state "1", second stage true state "2" and third stage true state "4" outputs of the 3 stage register 613. By appropriate connection of the 3 stage register 613 to the five AND gates 606-610, a pulse is provided to OR gate 611 for the first five of each seven pulses. OR gate 611 output is provided to AND gate 633, the other input of which is the F clock pulses which are gated out on 7's counter output 108 and comprise the D clock pulses to the character generator 105, FIG. 9.

The 10's counter logic diagram is shown in FIG. 10B and comprises a 4 stage register 624, the first three stages of which are interrogated by AND gates 620-622 respectively. AND gate 625 receives the true output of the fourth stage "8" and the true output of the second stage "2", which causes the 4 stage register 624 to be reset upon receipt of every tenth incrementing $\overline{X}$ pulse received on line 631. Each time the register 624 is reset by AND gate 625, a single shot multivibrator 605 sends a CV pulse output on output line 603 to the designated word address detector 600. Since $\overline{X}$ pulses occur at the start of each horizontal scan line, the DL 109 output of the AND gates 620-622 provide a parallel 3 bit word which represents which one of the 1st seven of each group of ten horizontal scan lines that is being scanned at any given instant. By connecting the 4th stage "8" through the inverter 623 to AND gates 620-622, the DL outputs are held at zero on the 8th, 9th and 10th pulse of each group of ten $\overline{X}$ pulses. The character generator 105 will not issue any output dot pulses when DL command lines 109 are all zero. This permits the formation of the spaces between character lines. The register 624 is also reset upon the occurrence of each $\overline{X}$ pulse which occurs during the vertical blanking interval by connecting the V pulse on line 628 and the $\overline{X}$ pulse on line 629 into AND gate 606, to the reset line 602. This enables the register to be in the reset state as soon as the vertical blanking pulse ends and the $\overline{X}$ pulse appears at the initiation of the first horizontal scan line on each frame. Diode 627 is used to preclude the output from AND gate 606 from initiating a CV pulse during the vertical retrace period.

RASTER AND BLANKING CONTROL (FIG. 12)

The raster and blanking control 525, FIG. 9, establishes the timing signals which controls the relationship of all synchronizing signals for display of text and dictionary data on the TV screen. Since a standard TV set is intended to be used as a display unit in one embodiment of the invention, the timing has been established to function within the design constraints of the standard TV receiver. Accordingly, the vertical and horizontal synchronization frequencies have been selected to be easily within the synchronization capability of the standard set. The vertical synchronization frequency (V) is set, as in standard TV transmission, to 60 cps; the horizontal synchronization frequency (H) is slightly displaced from standard at H=262 V. This results in an overlying scans on every field as compared to the interlaced scan which results when the standard horizontal sync frequency is set to 262½ V. In standard TV transmission, vertical blanking comprises about 6.5% of the vertical scanning time so that actually only 490 lines are actually seen. In this embodiment, the vertical blanking time is 12/250 or 4.8% of the vertical scanning time which is within the capability of standard sets and enables display of 25 character lines of 10 scan lines each.

Because the bandwidth of the video amplifiers of standard U.S. TV receivers are frequently rather limited, this embodiment employs only 32 characters per line at 7 dots per character for a 5×7 dot matrix.

Accordingly, one horizontal scan must be capable of displaying 224 dots (7×32=224). Proper design practice recommends that the horizontal blanking and retrace interval be approximately one third of the horizontal sync pulse interval. Accordingly, the basic oscillator (F) frequency is set at 336×H which provides 224 dot intervals during scanning and 112 dot intervals during blanking. Since each character is seven dots wide, the character horizontal pulse interval (CH) is obtained by dividing the F clock by seven and the character line interval (CV) is obtained by dividing the X sync pulse frequency by ten since there are ten X pulses per character line when using a 5×7 matrix thereby providing three lines as intercharacter line spacing.

In view of the above, the timing frequencies are summarized as follows:

$V = 60$ Hz $X = H = 262$ V $= 15720$ Hz $F = 336$ H $= 5.28192$ MHz $CV = H/10$ $CH = F/7$

Figure 13:
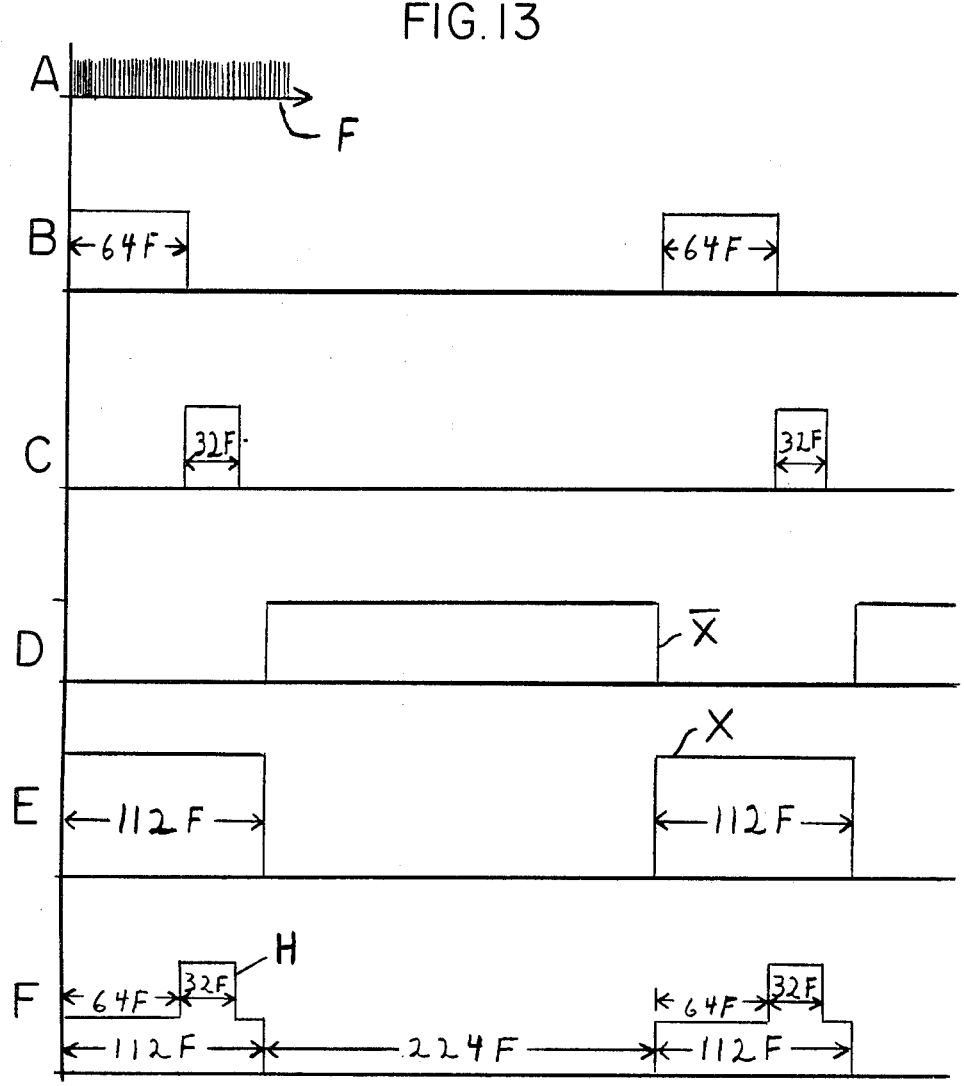
FIG. 13 is an illustration of some of the signal waveforms of certain timing signals.

With particular reference to the schematic of FIG. 12, and waveform diagrams of FIG. 13 and FIG. 14, the logic for generating these frequencies are shown. The F oscillator 801, is divided by 336 in register 802. Each true pulse from divider 802 sets latch 803 and FF 810. Latch 803 output is one input to AND gate 804. The other input to AND gate 804 is the F clock pulse train. The output of AND gate 804 is sent to divider 805 which provides one output pulse for each 64 input pulses.

Since divider 802 provides one pulse out for each 336 pulses of the F oscillator, the output of the latch 803 and FF 810 become true on the 336th pulse. Due to the fact that the divider 805 starts to count F oscillator pulses only after latch 803 goes true, FF 810 is reset 64 F pulse intervals after it goes true. The FF 810 output is sent to divider 816 and is illustrated in FIG. 13B.

At the instant that FF 810 is reset, FF 809 is set and divider 811 starts counting the F oscillator pulses which were gated through AND gate 808 after divider 805 went true. When divider 811 goes true, FF 809 is reset. Output of FF 809 is sent to diode 812 and is illustrated by FIG. 13c.

As shown in FIG. 12, AND gate 804 also is connected to divider 806 which provides a reset to FF 807 and to latch 803 upon occurrence of the 112th pulse. The Q output of FF 807 is a waveform which is 112 F pulse intervals as shown in FIG. 13E. The Q output of FF 87 is also employed as a timing signal designated as X and is illustrated in FIG. 13d. The outputs of FF 809 and FF 807, are coupled through series resistors 836 and 835, respectively, providing current source which are added together across resistor 814 providing the horizontal blanking and synchronizing pulse output 815 designated H and illustrated at FIG. 13F.

The vertical blanking and sync signal is synchronized to the F oscillator by counting the output designated FIG. 13B, of FF 810 in dividers 816 and 831. Divider 831 is a divide by 262 which resets the divider 816 on every 262nd pulse. The output of divider 816 provides a trigger pulse to FF 821, FF 818, FF 832 and to single shot multivibrator 817. MV 817 provides an output pulse which lasts more than three but less than six H pulse intervals to AND gate 820. The FIG. 13B pulse output of FF 810 is also provided to AND gate 820, AND gate 833 and AND gate 823. When the 253rd pulse from FF 810 is received, the FF 821 is reset by output from divider 822 and FF 834 and FF 824 are set. Output of FF 821 is designated as Y and illustrated in FIG. 14A. After the 254th pulse, MV 817 resets and disables AND gate 820.

When the 256th pulse appears, divider 825 provides a reset pulse to FF 824 which provides the output designated as Z through series resistor 838 to diode 827, illustrated at FIG. 14B.

When the 262nd pulse from FF 810 appears, divider 819 provides a reset to FF 818 to provide the output through resistor 837 to diode 828 illustrated at FIG. 14C. The output across resistor 829 is the vertical blanking and sync pulse designated as V and illustrated at FIG. 14D. Divider 819 also provides a reset to FF 832, divider 822, and FF 834 to assure their proper reset status for the initiation of the next sequence.

DICTIONARY DISPLAY MODE

With reference to FIG. 1, in order to initiate the display of the definition of any word of text, the operator needs to select dictionary mode with switch 3 in system control 1. With reference to FIG. 3, when dictionary mode is selected by switch 3 a voltage on line 137 issues and sets latch 132. When switch 550 is actuated and the light pen is in position over a selected word, designated word detector 600 sends the address of the designated word on line 119 to a serial to parallel register (not shown) in display control 150. The parallel output of the register is provided on lines 117 and 117'. The system will operate so that whenever both the DW address 119 and DW pulse on 547 issue, the speech synthesizer 118 will operate to provide an audible output and the serial to parallel register in display control 150 will store the designated word address. Storage of the designated word address in display control 150 permits addressing of dictionary address RAM 53 on lines 117' upon switching the display control switch 3 to dictionary mode, thereby activating all the dictionary functions.

The next V pulse occurring after dictionary mode selection energizes one shot MV 123. Dictionary start on 137 also causes dictionary latch 132 to set. The designated word address is provided from display control 150 to dictionary address RAM 53 which causes dictionary address counter 39 to initialize at the address from dictionary address RAM 53. Display control 150 also provides a load timing signal to address counter 39 and a read timing signal to dictionary RAM 36 to read out the first dictionary character on line 138. The dictionary address counter 39 is incremented and dictionary RAM 36 read out synchronously to now load the line of dictionary characters into the character line buffer 103. One shot MV 123 enables AND gate 120 through OR gate 125, providing 256 increment pulses to AND gate 133. If the definition is one line or less, DC3 detector 136 senses a dictionary end marker in RAM 36 output and disables AND gate 133 to stop further character retrieval. If definition is more than one line, AND gate 122, AND gate 120, in combination with the divider 121 will provide to AND gate 133, during the CV pulse period as determined by MV 605 (FIG. 10) through AND gate 122, pulses to increment dictionary address counter 39 and provide a stream of bytes from dictionary RAM 36 on line 138 to display control 150. When DC3 is detected on the output of dictionary RAM 36 by detector 136, AND gate 133 is disabled and prevents further advance of counter 39.

The dictionary address counter 39 is reloaded to the initial address by every vertical retrace V, so the process repeats and the TV screen will continue to refresh and display the line or lines of dictionary data being retrieved. When the operator desires to see the text material again, he needs to re-operate switch 3 in control 1 and the dictionary latch 132 is reset. When the latch 130 is set again, on the next V pulse, the text display process described earlier is reinitiated.

It is claimed:

1. A visual and auditory display system including means for selecting a passage of text, means responsive to binary electrical signals for displaying said passage of text, means for selecting and designating one word of said passage of text, and means responsive to said selecting and designating means for providing a synthesized audible sounding of said selected and designated one word.

2. A visual and auditory display system including:
   first electronic means for selecting a passage of text;
   second electronic means responsive to binary electrical signals for sending signals to a visual display for displaying said selected passage of text;
   means for selecting and designating one word of said passage of text; and
   means responsive to said selecting and designating means for providing a synthesized audible sounding of said selected and designated one word.

3. Apparatus of claim 1 or 2 further including means for displaying in legible form the definition of said selected and designated one word in response to said selecting and designating means.

4. An electronically assisted method for aiding students of a language to learn to read the legible form of said language and to pronounce the spoken form of a language, comprising:
   storing a continuous passage of text of said language comprising a plurality of coded words and selectively providing electrical signals representative of a contiguous portion of said plurality of coded words of said continuous passage;
   converting said electrical signals representative of said contiguous portion into commands for controlling a visual display;

visually displaying simultaneously all said words of said contiguous portion of said continuous passage in said legible form of said language responsive to said commands; and providing an audible output substantially immediately responsive to designation by an operator of one of said plurality of words appearing on said visual display, said audible output being a representation of the spoken form of said designated word.

5. The method of claims 4 including providing a definition output substantially immediately responsive to selection and designation for definition by an operator of one of said plurality of words appearing on said visual display.

6. The method of claim 4 including:

providing immediately a definition output of one of said plurality of words appearing on said visual display in a language other than the language visually displayed responsive to selection and designation for definition by an operator.

7. A device for aiding in the teaching of reading and speaking comprising:

bulk memory means for storing a continuous passage of text of a language in a plurality of codes including codes representing the legible and spoken form of said language, said continuous passage comprised of a plurality of words of said language, said means for storage providing upon command electrical output signals representative of selected contiguous words of said continuous passage;

means for converting said electrical signals representative of said contiguous words of said continuous passage into commands, means for visually displaying said contiguous words of said continuous passage in words of said legible form of said language responsive to said commands from said means for converting;

word designator means, said word designator means for selecting one of said contiguous words in any one line of said contiguous words being visually displayed; and means substantially immediately responsive to said selection by said word designator means for creating an audible output, said audible output being the spoken form of said designated word.

8. The device of claim 7 wherein said continous passage includes code representing the definition of said words of said passage, means for selecting a definition mode, and means for decoding of said definition of said designated word and for causing said definition of said designated word to appear on said visual display substantially immediately following selection.

9. A machine comprising:

means for receiving a stream of coded data representing a page of text in a language having a legible and spoken form, wherein words of said text are represented in a plurality of forms including a first and second form, said first form of said representation of each said word being coded data representing the legible characters of said word and said second form of said representation of said word being coded data representing the sounding of said word, said means for receiving said stream of coded data including means for selecting a segment of said stream of coded data representing a plurality of contiguous words in said text and further including means for identifying the line and word position of each word in each line of said page of text;

memory means for temporarily storing said selected segment of said stream of coded data for each word in said segment, said memory means including means for loading said memory and means for accessing said memory by addressing any word of said selected segment;

means for sequentially retrieving the said first form of said representation of each word in said segment from said temporary memory means;

a decoder, said decoder being connected and responsive to said means for sequentially retrieving the said first form of said representation, said decoder providing an output;

means for causing said output of said decoder to be provided to a visual display means for displaying said segment of said passage;

means for retrieving said second form of said representation of each word in said segment from said temporary storage means;

means for selectively permitting designation for audible sounding of any single word of said segment appearing on said visual display, said means for selectively permitting designation for audible sounding providing the address to said means for retrieving said second form of said representation for retrieving said second form for a said designated word;

an audio synthesizer having an input, said audio synthesizer being coupled to said means for retrieving said second form of said representation of each word; and means in said audio synthesizer for decoding data in said second form received at its input and for creating an audible output being the audible form of said designated word.

10. A machine comprising:

means for providing a stream of coded data representing a page of written text wherein each word of said text is represented by a plurality of forms, the first form of said representation of said word being coded data representing the spelling of said word and the second form of said representation of said word being coded data representing the speech sounding of said word;

means for selecting a segment of said stream of coded data representing a plurality of continguous words in said written text including means for identifying the line and word number for each word in each line of said segment;

first temporary memory means for storing said selected segment of said stream of coded data including means for storing separately said coded data in said first form and said coded data in said second form for each word in said segment, each said word having an address in said first temporary memory means;

means for storing in a second temporary menory the address in said first temporary memory of each form of said coded data for each word in said segment;

a decoder for generating written text represented by said first form of coded data, said decoder having an input and output;

means for causing coded data for said contiguous words in said first form in said first temporary memory means to be provided to the said input of said decoder;

means for causing the output of said decoder to be sent to a visual display means for displaying said segment of said written text;

means permitting designation of any word of said segment of said written text appearing on said visual display, said means for permitting designation being coupled to said second temporary memory for retrieving the address in said first temporary memory of said coded data in said second form representing the sounding of said designated word;

an audio synthesizer having an input;

means responsive to said retrieved address for retrieving and sending the coded data in said second form at said address in said first temporary memory means to the input of said audio synthesizer; and means in said audio synthesizer for decoding data in said second form received at its input and creating an audio output being the spoken form of said designated word.

11. The machine of claim 7 or 10 wherein said plurality of forms of representing said passage includes a third form being representative of the definition in legible form of said words, and wherein said machine includes means for selecting a definition mode, means for causing said legible form of said definition of said designated word to appear on said visual display substantially immediately in response to designation of a word.

12. A learning aid comprising:

means for providing a linear stream of coded data representing a written text wherein each frame of said coded data represents a word in a plurality of forms including a first form of said coded data representing the spelling of the word and a second form of said coded data representing the sounding of the word;

means for selecting a segment of said linear stream of coded data representing a plurality of frames from said linear stream;

temporary storage means;

means for loading said segment into said temporary storage including means for separating coded data representing spelling from coded data representing sounding;

and means for storing a segment of said linear stream of coded data including means for separately storing coded data representing spelling and coded data representing sounding and further including means for determining the address of each form of each word in said temporary storage;

a spelling decoder having an input and output for generating characters represented by said spelling code, means for providing said spelling decoder coded data from said temporary storage, a visual display, said visual display being responsive to said decoder output for displaying said segment of said written text;

means permitting designation for audio sounding by an operator of any word of said segment of said written text appearing on said visual display;

means for determining the address in said temporary storage of said coded data representing the sounding of said designated word and means for retrieving from said temporary storage responsive to said address said coded data representing the sounding of said designated word; and an audio synthesizer for providing an audio sounding of said designated word, said audio synthesizer being responsive to said coded word representing the sounding of said designated word.

13. A visual and auditory display system adopted for cooperating with means for retrieving data indicative of a text from a memory means, said memory means storing said data by binary encoding, said system comprising means for controlling said means for retrieving binary data such that said binary data is converted to electrical binary signals representative of a selected contiguous passage of said text material, means responsive to said electrical binary signals for sending signals to a visual display for displaying said contiguous passage of said text material, means for selecting and designating one word of said contiguous passage of said text material, and means responsive to said selecting and designating means for providing a synthesized audible sounding of said selected and designated one word.

14. The system of claim 13 wherein means for controlling said means for retrieving binary data further includes means to convert binary signals representative of definitions of portions of said text material to electrical binary signals representative of definitions, and means responsive to selecting and designating means for providing a display of the definition of said selected and designated one word.

15. A new method of using digital electronic apparatus to teach students to learn to read and to speak a language comprising:

storing binary data indicative of a continuous passage of text, selecting and displaying a contiguous passage of said text, selecting and designating one word of said contiguous passage of said text responsive to instruction from said student, and providing a synthesized audible output substantially immediately responsive to a speech request from a student, said audible output being a representation of the spoken form of said selected and designated word.

16. The new method of using the digital electronic apparatus of claim 15 further comprising:

displaying in legible form the definition of said selected and designated one word substantially immediately responsive to a definition request from said student.

17. A visual and auditory display system comprising:

visual display means responsive to binary data representative of a passage of text for displaying said text;

means for selecting and designating one word of said passage of text;

means responsive to said selecting and designating means for providing an output display in another form of said selected and designated one word.

18. The system of claim 17 wherein said output display is a synthesized audible output of the spoken form of said selected and designated word.

19. The system of claim 18 wherein said output display includes a visual alphanumeric representation of the definition of said selected and designated one word.

20. The system of claim 18 wherein said output display includes a visual alphanumeric representation of the translation in another written form of another human language of said selected and designated one word.

* * * * *